US010281979B2

(12) United States Patent
Oyama

(10) Patent No.: US 10,281,979 B2
(45) Date of Patent: May 7, 2019

(54) INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Tohru Oyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 331 days.

(21) Appl. No.: 14/828,935

(22) Filed: Aug. 18, 2015

(65) Prior Publication Data

US 2016/0055366 A1 Feb. 25, 2016

(30) Foreign Application Priority Data

Aug. 21, 2014 (JP) .................. 2014-168618

(51) Int. Cl.
*G06F 3/01* (2006.01)
*G06K 9/00* (2006.01)
*G06K 9/32* (2006.01)

(52) U.S. Cl.
CPC ......... *G06F 3/013* (2013.01); *G06K 9/00597* (2013.01); *G06K 9/3233* (2013.01)

(58) Field of Classification Search
CPC .. G06F 3/013; G06K 9/00597; G06K 9/3233; G06T 15/20; G06T 2215/16; G06T 2215/00
See application file for complete search history.

(56) References Cited

U.S. PATENT DOCUMENTS

| 5,253,008 A | * | 10/1993 | Konishi | ................ | G03B 13/02 |
| | | | | | 396/234 |
| 5,714,997 A | * | 2/1998 | Anderson | .............. | H04N 19/27 |
| | | | | | 348/36 |
| 5,729,471 A | * | 3/1998 | Jain | ........................ | H04N 5/222 |
| | | | | | 345/419 |

(Continued)

FOREIGN PATENT DOCUMENTS

JP 2009-272970 A 11/2009

OTHER PUBLICATIONS

Kihwan Kim et al.; "Detecting Regions of Interest in Dynamic Scenes with Camera Motions", Georgia Institute of Technology, Atlanta, GA, USA, NVIDIA Research, Santa Clara, CA, USA, CVPR 2012.

(Continued)

*Primary Examiner* — Devona E Faulk
*Assistant Examiner* — Charles L Beard
(74) *Attorney, Agent, or Firm* — Canon U.S.A., Inc. IP Division

(57) ABSTRACT

With respect to images captured by cameras, content of which changes as time passes, an information processing apparatus determines an evaluation value with respect to content at each given time of the images according to a predetermined standard, and switches and displays an image on a display apparatus by selecting a camera image having a high evaluation value, while heightening an evaluation value of the camera image currently selected and displayed on the display apparatus for a predetermined period of time in order to prevent the image from being switched frequently.

17 Claims, 24 Drawing Sheets

(56) References Cited

U.S. PATENT DOCUMENTS

| | | | | |
|---|---|---|---|---|
| 5,850,352 A * | 12/1998 | Moezzi | ............... | H04N 5/222 |
| | | | | 345/419 |
| 6,144,375 A * | 11/2000 | Jain | ............... | G06F 17/30017 |
| | | | | 345/420 |
| 6,359,647 B1 * | 3/2002 | Sengupta | ......... | G08B 13/19608 |
| | | | | 348/143 |
| 6,741,250 B1 * | 5/2004 | Furlan | ............... | G06T 19/003 |
| | | | | 345/427 |
| 7,079,176 B1 * | 7/2006 | Freeman | ............... | G03C 1/26 |
| | | | | 348/207.1 |
| 7,193,645 B1 * | 3/2007 | Aagaard | ............... | H04N 5/222 |
| | | | | 348/157 |
| 7,427,996 B2 * | 9/2008 | Yonezawa | ............ | G06T 19/006 |
| | | | | 345/629 |
| 7,796,155 B1 * | 9/2010 | Neely, III | .......... | G06K 9/00771 |
| | | | | 345/418 |
| 8,184,069 B1 * | 5/2012 | Rhodes | ............... | G02B 27/017 |
| | | | | 345/8 |
| 8,253,760 B2 * | 8/2012 | Sako | ............... | H04N 13/044 |
| | | | | 345/589 |
| 8,320,709 B2 * | 11/2012 | Aratani | ............... | G06K 9/3216 |
| | | | | 345/633 |
| 8,792,138 B2 * | 7/2014 | Boggs | ............... | G09B 21/008 |
| | | | | 358/3.24 |
| 9,070,215 B2 * | 6/2015 | Oikawa | ............... | G02B 27/017 |
| 9,094,615 B2 * | 7/2015 | Aman | ............... | G01S 3/7864 |
| 9,099,152 B2 * | 8/2015 | Marcus | ............... | G11B 27/034 |
| 9,256,784 B1 * | 2/2016 | Taylor | ............... | G06K 9/00597 |
| 9,264,765 B2 * | 2/2016 | Sasaki | ............... | H04N 21/4402 |
| 9,288,545 B2 * | 3/2016 | Hill | ............... | H04N 21/4312 |
| 9,317,735 B2 * | 4/2016 | Watanabe | ............ | G06T 7/75 |
| 9,497,380 B1 * | 11/2016 | Jannard | ............. | H04N 5/23238 |
| 9,569,815 B1 * | 2/2017 | Abuelsaad | ............ | G06T 3/40 |
| 9,591,336 B2 * | 3/2017 | Cronin | ............... | H04N 5/247 |
| 9,602,700 B2 * | 3/2017 | Ahiska | ............ | G08B 13/19691 |
| 9,655,027 B1 * | 5/2017 | Cronin | ............... | H04W 40/244 |
| 9,693,108 B2 * | 6/2017 | Yang | ............... | H04N 21/482 |
| 9,846,681 B2 * | 12/2017 | Hashii | ............... | G06F 17/3089 |
| 9,881,373 B2 * | 1/2018 | Murakami | ........... | G02B 21/365 |
| 10,140,726 B2 * | 11/2018 | Nishino | ............ | G06K 9/00604 |
| 10,148,862 B2 * | 12/2018 | Tamura | ............. | H04N 5/23212 |
| 2001/0027398 A1 * | 10/2001 | Kohno | ............... | G10L 21/06 |
| | | | | 704/275 |
| 2002/0005902 A1 * | 1/2002 | Yuen | ............... | G08B 13/19643 |
| | | | | 348/211.99 |
| 2002/0122113 A1 * | 9/2002 | Foote | ............... | G06T 3/4038 |
| | | | | 348/48 |
| 2003/0023974 A1 * | 1/2003 | Dagtas | ............... | H04N 7/17318 |
| | | | | 725/47 |
| 2003/0184561 A1 * | 10/2003 | Vorst | ............... | G09B 9/30 |
| | | | | 345/619 |
| 2003/0210329 A1 * | 11/2003 | Aagaard | ............... | H04N 7/181 |
| | | | | 348/159 |
| 2004/0064207 A1 * | 4/2004 | Zacks | ............... | G06F 17/30787 |
| | | | | 700/91 |
| 2004/0110559 A1 * | 6/2004 | Chosokabe | ............ | A63F 13/10 |
| | | | | 463/30 |
| 2004/0120606 A1 * | 6/2004 | Fredlund | ............ | G06K 9/3233 |
| | | | | 382/305 |
| 2005/0018045 A1 * | 1/2005 | Thomas | ............... | G06K 9/209 |
| | | | | 348/157 |
| 2005/0093976 A1 * | 5/2005 | Valleriano | ............ | H04N 1/32101 |
| | | | | 348/143 |
| 2005/0273830 A1 * | 12/2005 | Silver | ............... | H04N 5/4401 |
| | | | | 725/105 |
| 2006/0026628 A1 * | 2/2006 | Wan | ............... | H04N 5/272 |
| | | | | 725/32 |
| 2006/0146132 A1 * | 7/2006 | Mayerson | ............ | H04N 5/247 |
| | | | | 348/143 |
| 2006/0181610 A1 * | 8/2006 | Carlsson | ............ | H04N 5/23238 |
| | | | | 348/159 |
| 2007/0279494 A1 * | 12/2007 | Aman | ............... | G01S 3/7864 |
| | | | | 348/169 |
| 2008/0088646 A1 * | 4/2008 | Sako | ............... | G02B 27/0172 |
| | | | | 345/647 |
| 2008/0118153 A1 * | 5/2008 | Wu | ............... | G06K 9/00711 |
| | | | | 382/190 |
| 2008/0129825 A1 * | 6/2008 | DeAngelis | ......... | A63B 24/0021 |
| | | | | 348/169 |
| 2008/0192116 A1 * | 8/2008 | Tamir | ............... | G06T 7/292 |
| | | | | 348/157 |
| 2008/0300055 A1 * | 12/2008 | Lutnick | ............... | G07F 17/3209 |
| | | | | 463/39 |
| 2009/0052805 A1 * | 2/2009 | Knee | ............... | H04N 5/247 |
| | | | | 382/299 |
| 2009/0113505 A1 * | 4/2009 | Yu | ............... | H04N 7/17318 |
| | | | | 725/114 |
| 2009/0128549 A1 * | 5/2009 | Gloudemans | ............ | G06T 15/20 |
| | | | | 345/419 |
| 2009/0128568 A1 * | 5/2009 | Gloudemans | ............ | G06K 9/346 |
| | | | | 345/474 |
| 2009/0128577 A1 * | 5/2009 | Gloudemans | ............ | G06T 15/20 |
| | | | | 345/582 |
| 2009/0129630 A1 * | 5/2009 | Gloudemans | ............ | G06T 15/20 |
| | | | | 382/103 |
| 2009/0284601 A1 * | 11/2009 | Eledath | ............... | G06K 9/209 |
| | | | | 348/157 |
| 2009/0315978 A1 * | 12/2009 | Wurmlin | ............... | G06T 5/005 |
| | | | | 348/43 |
| 2010/0033576 A1 * | 2/2010 | Shibata | ............... | H04N 7/181 |
| | | | | 348/159 |
| 2010/0040356 A1 * | 2/2010 | Ishikawa | ............ | G03B 13/20 |
| | | | | 396/124 |
| 2010/0103290 A1 * | 4/2010 | Tsurumi | ............... | H04N 5/2628 |
| | | | | 348/239 |
| 2010/0104256 A1 * | 4/2010 | Tsurumi | ............... | G06K 9/00335 |
| | | | | 386/241 |
| 2010/0149175 A1 * | 6/2010 | Tan | ............... | G06T 15/205 |
| | | | | 345/419 |
| 2010/0161409 A1 * | 6/2010 | Ryu | ............... | G06Q 30/02 |
| | | | | 705/14.43 |
| 2010/0182436 A1 * | 7/2010 | Boman | ............... | A63C 19/10 |
| | | | | 348/207.1 |
| 2010/0232499 A1 * | 9/2010 | Reme | ............... | H04N 19/172 |
| | | | | 375/240.12 |
| 2010/0321482 A1 * | 12/2010 | Cleveland | ............... | G06F 3/012 |
| | | | | 348/78 |
| 2011/0090344 A1 * | 4/2011 | Gefen | ............... | H04N 5/232 |
| | | | | 348/169 |
| 2011/0242326 A1 * | 10/2011 | Essa | ............... | G06N 3/006 |
| | | | | 348/157 |
| 2012/0121174 A1 * | 5/2012 | Bhagavathy | ....... | G06K 9/00711 |
| | | | | 382/165 |
| 2012/0154522 A1 * | 6/2012 | Yoo | ............... | H04N 5/247 |
| | | | | 348/36 |
| 2012/0154593 A1 * | 6/2012 | Anderson | ............... | H04N 5/222 |
| | | | | 348/157 |
| 2012/0162462 A1 * | 6/2012 | Takeuchi | ........... | H04N 5/23212 |
| | | | | 348/222.1 |
| 2012/0188279 A1 * | 7/2012 | Demaine | ............... | A63F 13/10 |
| | | | | 345/633 |
| 2012/0188452 A1 * | 7/2012 | Keiser | ............... | G06T 13/00 |
| | | | | 348/559 |
| 2012/0206597 A1 * | 8/2012 | Komoto | ............... | G06K 9/00805 |
| | | | | 348/135 |
| 2012/0249831 A1 * | 10/2012 | Porter | ............... | H04N 5/23206 |
| | | | | 348/231.3 |
| 2012/0320169 A1 * | 12/2012 | Bathiche | ............... | G06F 3/011 |
| | | | | 348/53 |
| 2013/0093899 A1 * | 4/2013 | Curcio | ............... | G06F 17/30265 |
| | | | | 348/159 |
| 2013/0113802 A1 * | 5/2013 | Weersink | ............... | G06T 15/20 |
| | | | | 345/427 |
| 2013/0135315 A1 * | 5/2013 | Bares | ............... | G06T 13/20 |
| | | | | 345/473 |
| 2013/0148861 A1 * | 6/2013 | Ferlatte | ............... | G06K 9/00624 |
| | | | | 382/107 |

(56) References Cited

U.S. PATENT DOCUMENTS

| | | | |
|---|---|---|---|
| 2013/0176438 A1* | 7/2013 | Mate | H04N 7/181 348/157 |
| 2013/0177293 A1* | 7/2013 | Mate | H04N 9/8205 386/239 |
| 2013/0194469 A1* | 8/2013 | Nakata | H04N 5/23245 348/300 |
| 2013/0225289 A1* | 8/2013 | Yoshimitsu | A63F 13/10 463/31 |
| 2013/0278625 A1* | 10/2013 | Obata | G06F 3/013 345/619 |
| 2013/0329068 A1* | 12/2013 | Hamanaka | H04N 5/23293 348/218.1 |
| 2014/0002351 A1* | 1/2014 | Nakayama | G06F 3/012 345/156 |
| 2014/0022159 A1* | 1/2014 | Leigh | G06F 3/012 345/156 |
| 2014/0074759 A1* | 3/2014 | Lewis | G06F 17/30849 706/12 |
| 2014/0085203 A1* | 3/2014 | Kobayashi | G01S 19/14 345/158 |
| 2014/0104307 A1* | 4/2014 | Tanaka | G06F 3/005 345/619 |
| 2014/0122485 A1* | 5/2014 | Shyamsundar | G06F 17/30286 707/737 |
| 2014/0195914 A1* | 7/2014 | Gillard | H04N 21/25891 715/719 |
| 2014/0266160 A1* | 9/2014 | Coza | G01B 7/003 324/207.11 |
| 2014/0349750 A1* | 11/2014 | Thompson | A63F 13/12 463/31 |
| 2015/0015704 A1* | 1/2015 | Hirasawa | G06T 7/2093 348/143 |
| 2015/0016798 A1* | 1/2015 | Fujimatsu | G06K 9/00362 386/223 |
| 2015/0019995 A1* | 1/2015 | Song | G06F 3/013 715/750 |
| 2015/0022721 A1* | 1/2015 | Agarwal | H04N 21/4316 348/564 |
| 2015/0042866 A1* | 2/2015 | Wakazono | H04N 5/23212 348/346 |
| 2015/0085131 A1* | 3/2015 | Anderson | H04N 7/181 348/157 |
| 2015/0138188 A1* | 5/2015 | Gillard | G06T 15/00 345/419 |
| 2015/0138238 A1* | 5/2015 | Wagg | G06T 11/60 345/634 |
| 2015/0207984 A1* | 7/2015 | Hamano | H04N 5/23212 348/349 |
| 2015/0244928 A1* | 8/2015 | Jo | H04N 5/232 348/211.4 |
| 2015/0264258 A1* | 9/2015 | Bervoets | H04N 5/23238 348/36 |
| 2015/0271570 A1* | 9/2015 | Pomeroy | H04N 21/8133 725/14 |
| 2015/0296165 A1* | 10/2015 | Sato | G08B 25/08 348/158 |
| 2015/0297949 A1* | 10/2015 | Aman | G06T 7/246 348/157 |
| 2015/0302256 A1* | 10/2015 | Ikeda | G06K 9/00771 382/103 |
| 2015/0317522 A1* | 11/2015 | Ikeda | H04N 7/18 348/218.1 |
| 2015/0317822 A1* | 11/2015 | Haimovitch-Yogev | H04N 5/247 345/419 |
| 2015/0326932 A1* | 11/2015 | Hill | H04N 21/4312 725/32 |
| 2015/0350606 A1* | 12/2015 | Khanfor | H04N 5/23296 348/157 |
| 2015/0356751 A1* | 12/2015 | Iwafuchi | G09G 5/02 345/591 |
| 2015/0365660 A1* | 12/2015 | Wu | G06T 7/74 348/158 |
| 2015/0381885 A1* | 12/2015 | Kim | H04N 5/23219 348/207.1 |
| 2016/0029938 A1* | 2/2016 | Shudo | A61B 3/107 600/558 |
| 2016/0037195 A1* | 2/2016 | Shin | H04N 21/44222 725/14 |
| 2016/0095511 A1* | 4/2016 | Taguchi | A61B 3/0025 351/209 |
| 2016/0098934 A1* | 4/2016 | Tinjust | A61B 5/162 434/236 |
| 2016/0101358 A1* | 4/2016 | Ibrahim | A63F 13/42 463/33 |
| 2016/0105634 A1* | 4/2016 | Marchese | H04N 5/91 386/241 |
| 2016/0182894 A1* | 6/2016 | Haimovitch-Yogev | H04N 21/21805 348/43 |
| 2016/0205341 A1* | 7/2016 | Hollander | G06T 7/20 375/240.08 |
| 2016/0225012 A1* | 8/2016 | Ha | G06Q 30/0242 |
| 2016/0225122 A1* | 8/2016 | Boelter | H04N 21/42201 |
| 2016/0269794 A1* | 9/2016 | Shimura | H04N 21/44218 |
| 2016/0277345 A1* | 9/2016 | Mochizuki | H04L 12/1822 |
| 2016/0282900 A1* | 9/2016 | Levac | G06F 3/013 |
| 2016/0283483 A1* | 9/2016 | Jiang | G06F 17/3053 |
| 2016/0323559 A1* | 11/2016 | Matsunobu | H04N 13/0242 |
| 2016/0366332 A1* | 12/2016 | Gao | H04N 5/232 |
| 2016/0366365 A1* | 12/2016 | Iyer | G06F 3/013 |
| 2016/0366466 A1* | 12/2016 | Shen | H04N 21/431 |
| 2016/0379089 A1* | 12/2016 | Cricri | G06K 9/6255 382/225 |
| 2017/0007120 A1* | 1/2017 | Shudo | A61B 3/113 |
| 2017/0013253 A1* | 1/2017 | Huber | H04N 13/0402 |
| 2017/0026680 A1* | 1/2017 | Sugio | H04N 21/262 |
| 2017/0039719 A1* | 2/2017 | Merkel | G06F 3/013 |
| 2017/0046875 A1* | 2/2017 | Xu | G06T 15/20 |
| 2017/0054987 A1* | 2/2017 | Rangarajan | H04N 19/167 |
| 2017/0061314 A1* | 3/2017 | Schnurr | G06N 5/02 |
| 2017/0090739 A1* | 3/2017 | Kozuka | G06F 3/04847 |
| 2017/0091582 A1* | 3/2017 | Takata | A61B 5/055 |
| 2017/0098330 A1* | 4/2017 | Inomata | G06F 3/012 |
| 2017/0099433 A1* | 4/2017 | Cleveland | H04N 5/23219 |
| 2017/0099439 A1* | 4/2017 | Pulli | H04N 5/23264 |
| 2017/0111579 A1* | 4/2017 | Kankaanpaa | H04N 5/23258 |
| 2017/0118522 A1* | 4/2017 | Perez | G06Q 30/02 |
| 2017/0205061 A1* | 7/2017 | Broers | H05B 37/0227 |
| 2017/0264920 A1* | 9/2017 | Mickelsen | G06K 9/00335 |
| 2017/0264936 A1* | 9/2017 | Depies | H04N 21/4126 |
| 2017/0323539 A1* | 11/2017 | Takiguchi | G01S 17/42 |
| 2017/0323541 A1* | 11/2017 | Mizutani | G01C 11/02 |
| 2017/0359552 A1* | 12/2017 | Kobayashi | H04N 5/781 |
| 2017/0372457 A1* | 12/2017 | Sylvan | G02B 27/017 |
| 2017/0372466 A1* | 12/2017 | Hirota | G06T 7/75 |
| 2017/0374486 A1* | 12/2017 | Killham | H04N 13/279 |
| 2018/0012284 A1* | 1/2018 | Igarashi | G06Q 30/0631 |
| 2018/0018510 A1* | 1/2018 | Williams | G06T 7/248 |
| 2018/0043247 A1* | 2/2018 | Vandonkelaar | A63F 13/213 |
| 2018/0070074 A1* | 3/2018 | Nobori | H04N 13/0242 |
| 2018/0182114 A1* | 6/2018 | Hanamoto | H04N 5/2224 |
| 2018/0184072 A1* | 6/2018 | Yoshimura | G06T 15/205 |
| 2018/0197324 A1* | 7/2018 | Hanamoto | G06T 15/20 |
| 2018/0204381 A1* | 7/2018 | Kanatsu | H04N 13/282 |
| 2018/0300751 A1* | 10/2018 | Hammitt | G06K 9/6267 |
| 2018/0302610 A1* | 10/2018 | Masuda | H04N 7/188 |
| 2018/0311583 A1* | 11/2018 | Osman | A63F 13/213 |
| 2018/0316850 A1* | 11/2018 | Friebe | B60R 1/00 |
| 2018/0332218 A1* | 11/2018 | Yoshimura | H04N 5/23232 |

OTHER PUBLICATIONS

Kihwan Kim et al.; "Motion Fields to Predict Play Evolution in Dynamic Scenes", Georgian Institute of Technology, Atlanta, GA,

(56) References Cited

OTHER PUBLICATIONS

The Interdisciplinary Center, Herzliya, Israel, Disney Research, Pittsburg, PA, USA, CVPR 2010.

* cited by examiner

FIG. 6

| TYPE OF GAZE REGION | TYPE IMPORTANCE |
|---|---|
| BALL | 100 |
| SHOOT | 50 |
| PASS | 20 |
| COMPETITION | 30 |
| PK | 50 |
| CORNER KICK | 40 |
| FREE KICK | 40 |
| PENALTY | 20 |
| PLAYER A | 30 |
| PLAYER B | 20 |
| ⋮ | ⋮ |

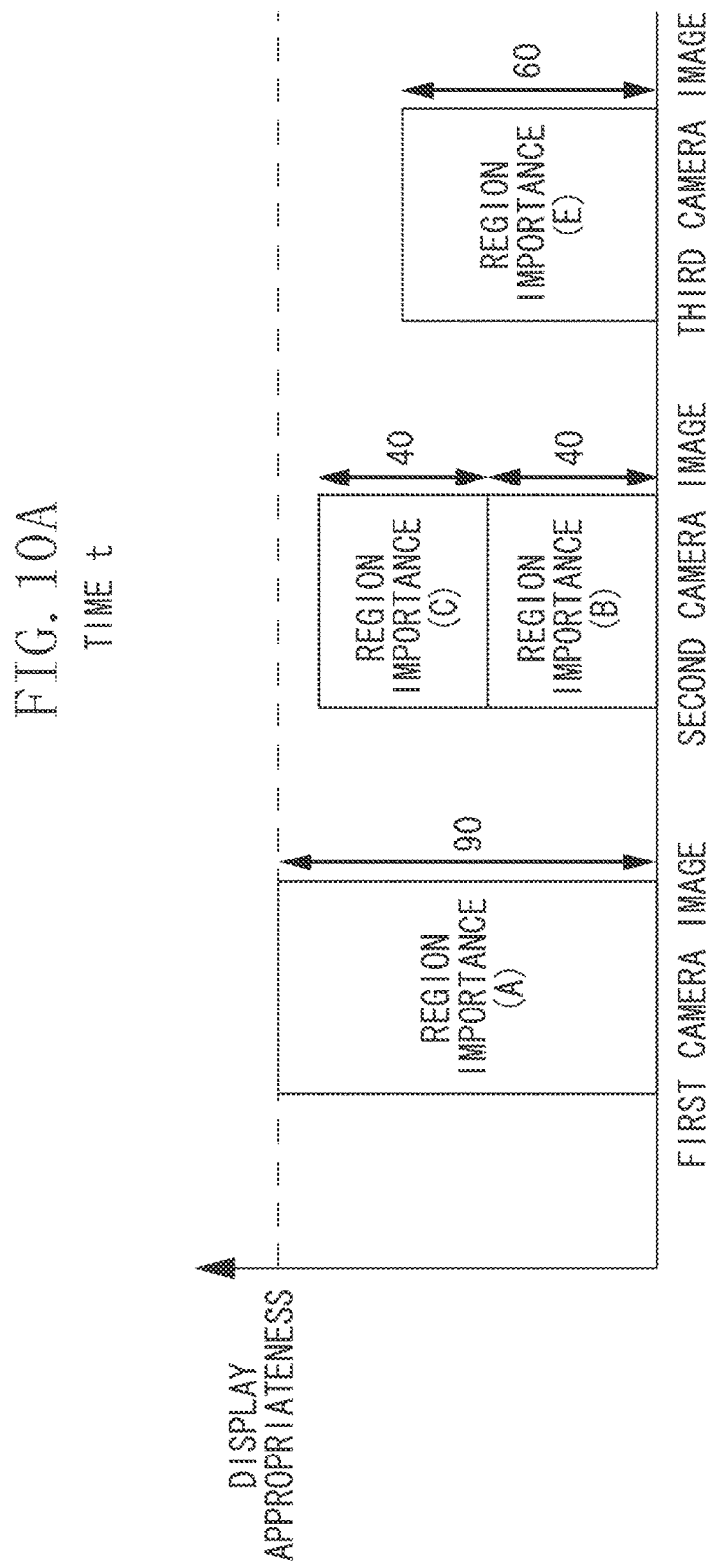

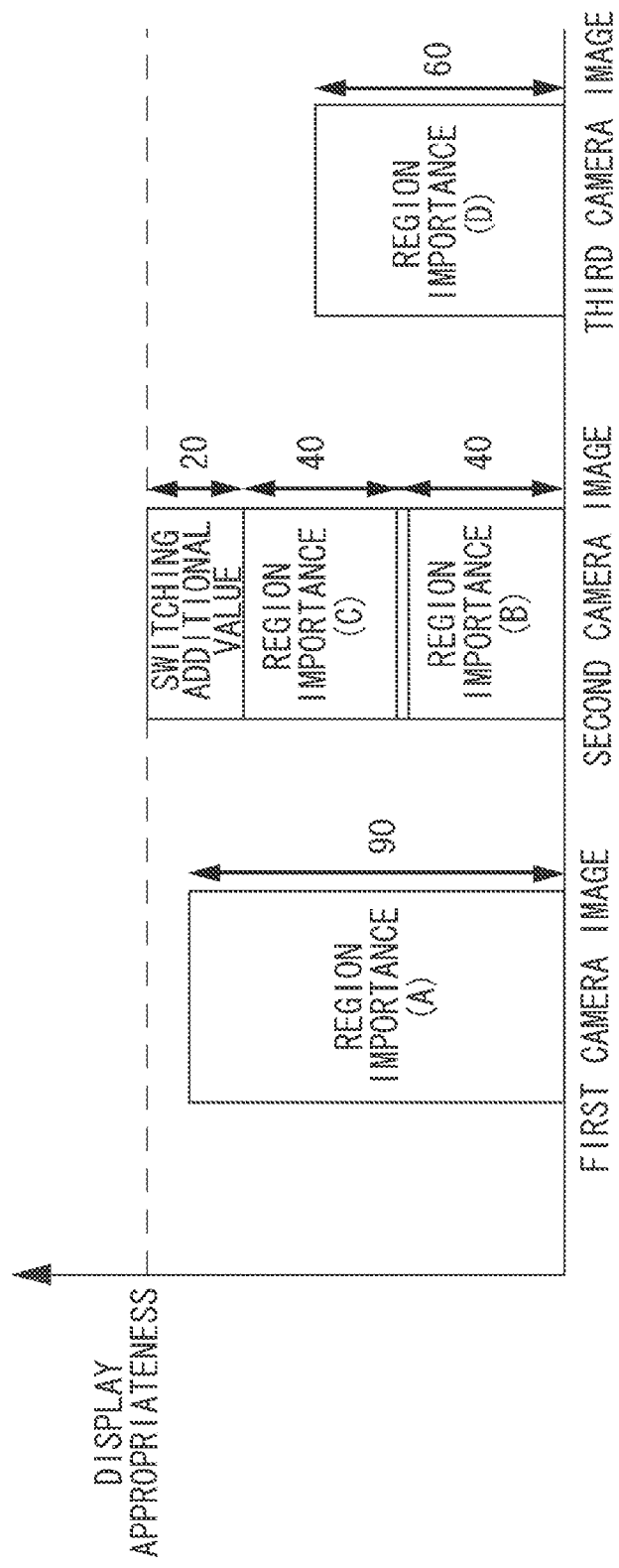

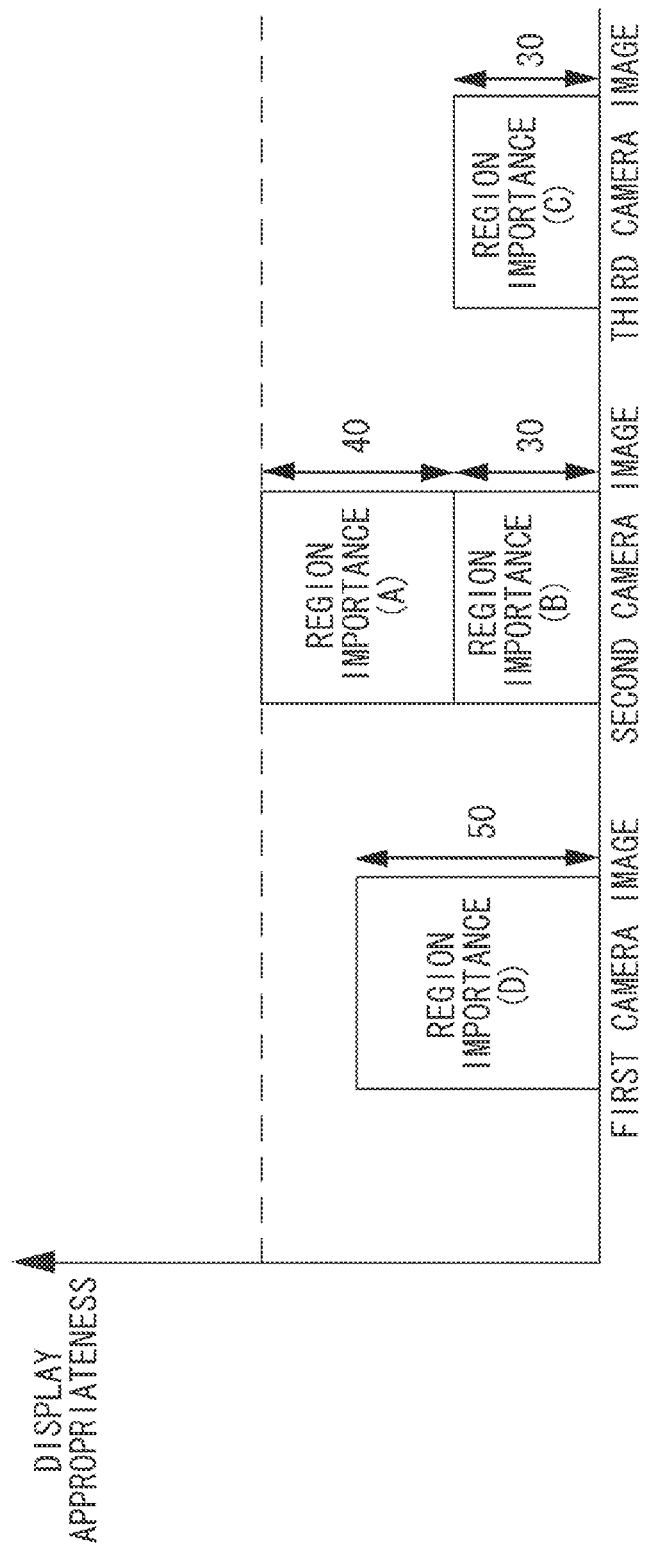

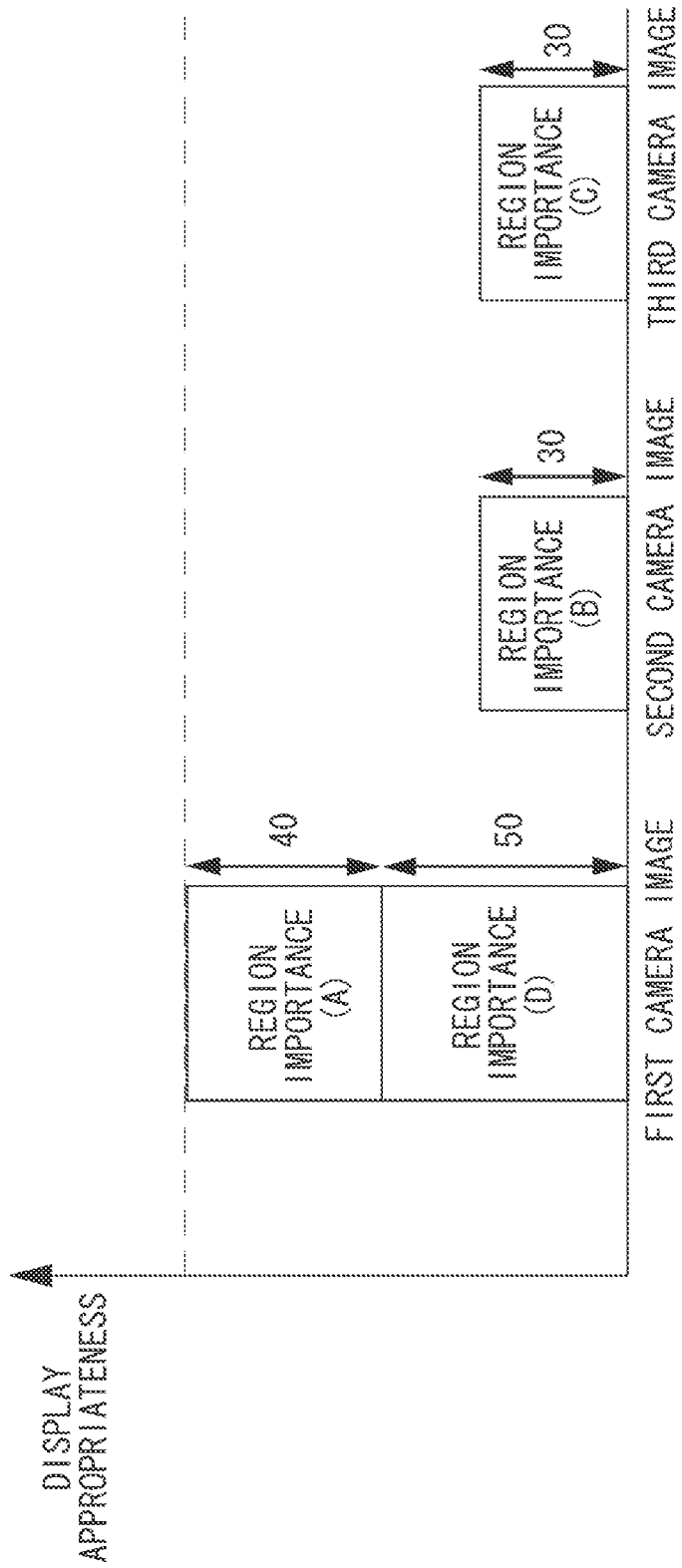

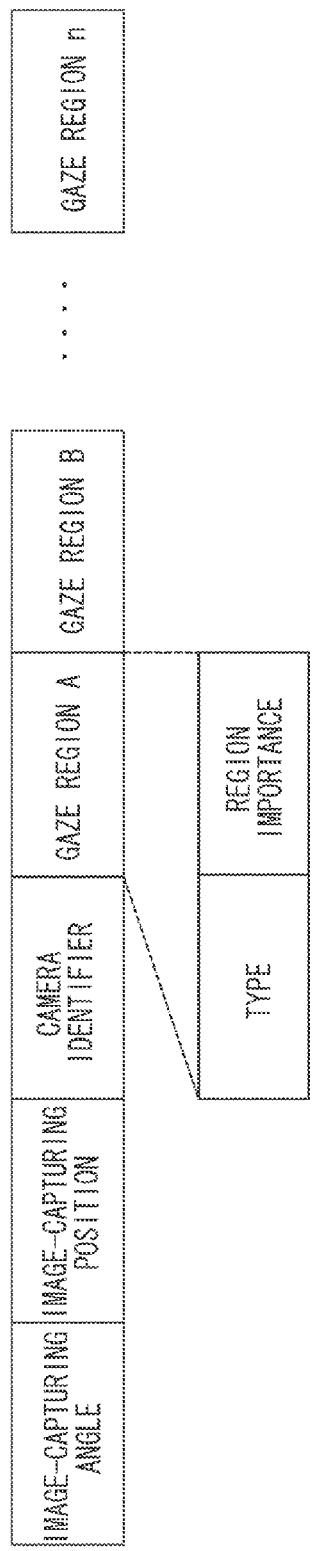

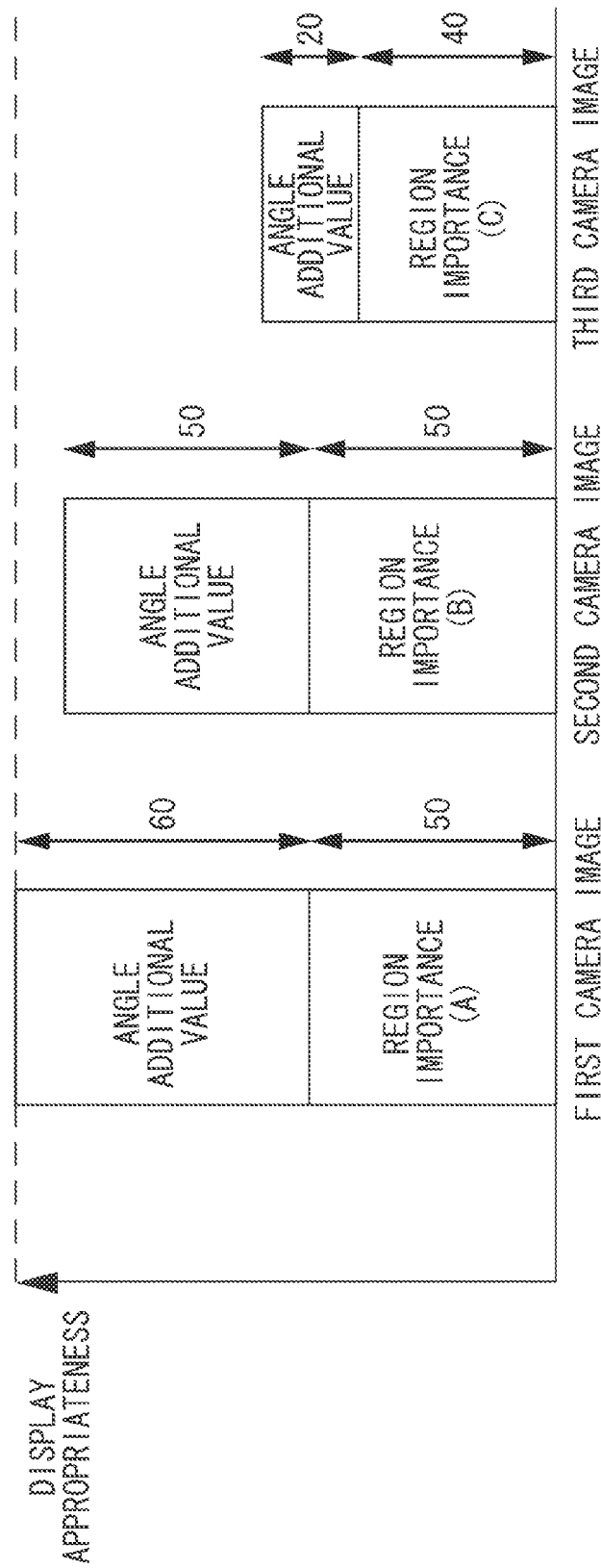

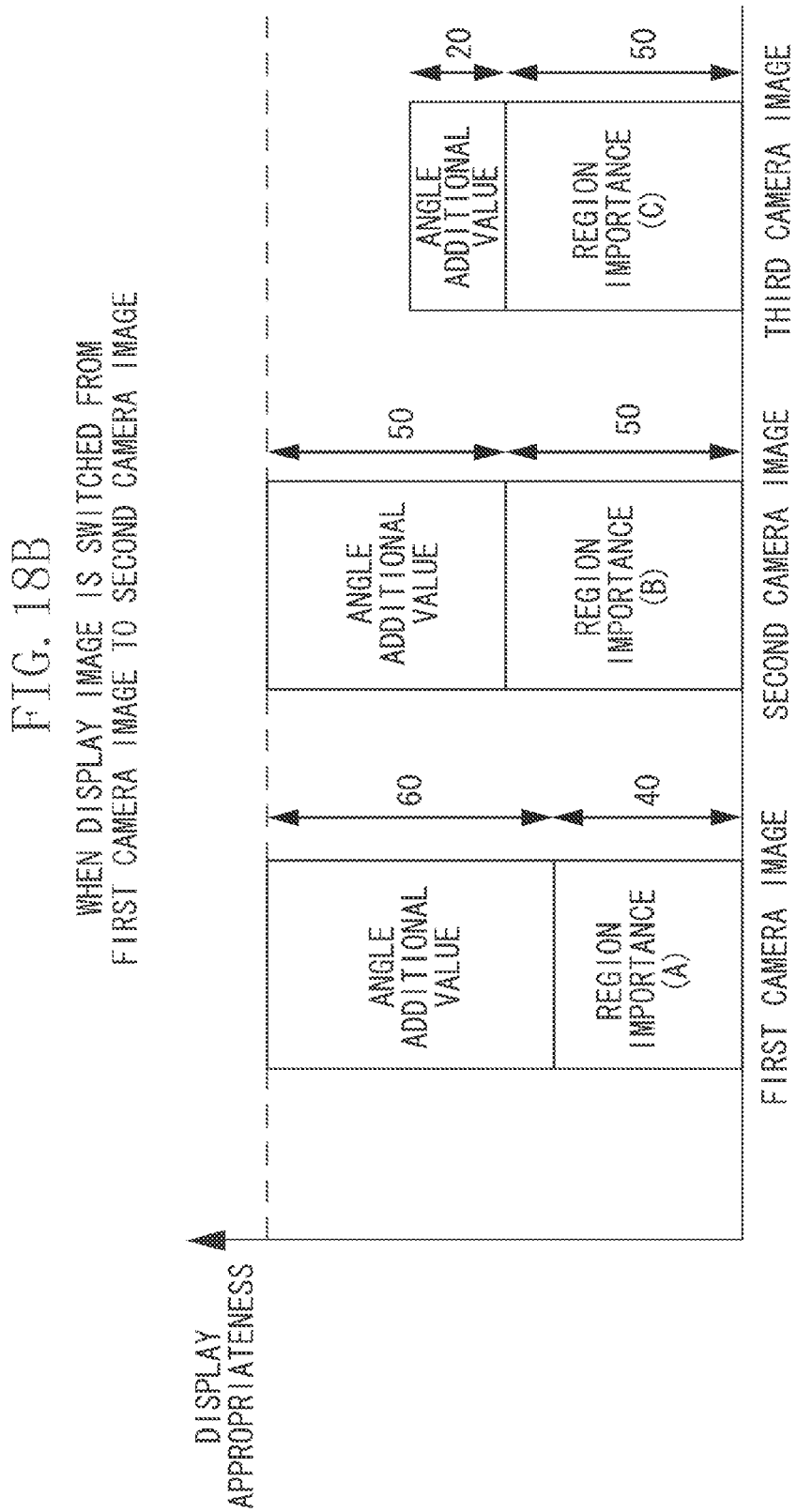

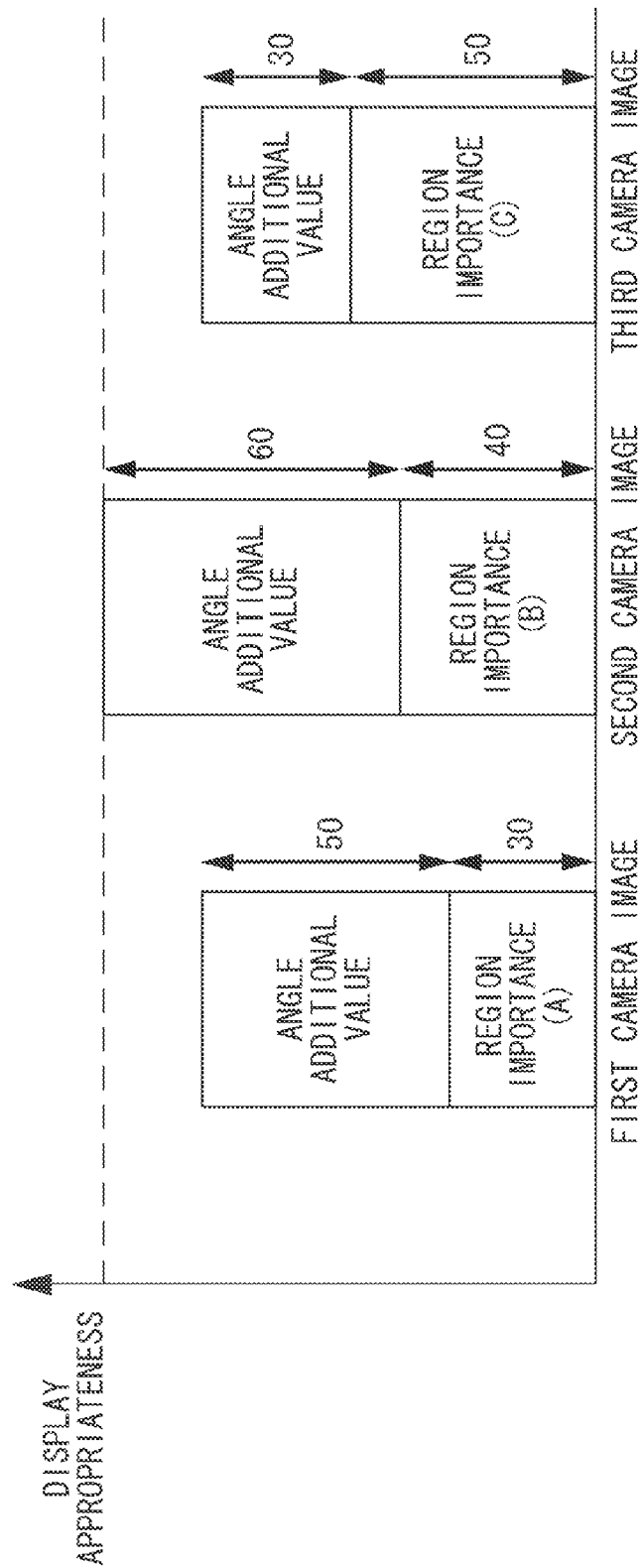

INFORMATION PROCESSING SYSTEM, INFORMATION PROCESSING METHOD, AND STORAGE MEDIUM

BACKGROUND

Field

Aspects of the present invention generally relate to an information processing system, an information processing method, and a storage medium.

Description of the Related Art

Conventionally, there is provided a system enabling an audience to freely select a display image from among a plurality of images captured by a plurality of cameras installed in a stadium where a sports game is taking place. Further, Japanese Patent No. 4934094 discusses a method of automatically switching an image while eliminating a troublesome operation in which the audience is required to consecutively input an instruction for switching a display. In the method described in Japanese Patent No. 4934094, with respect to the images acquired from a plurality of cameras, a level of the audience's interest is calculated based on the acquired images in order to display an image showing a high interest level. With the above-described method, an image the audience is highly interested in can be displayed from among a plurality of captured images.

However, for example, there may be a case where an object or a leading player in a sports game, which draws an attention of the audience, frequently moves back and forth between the images captured by cameras having image-capturing regions adjacent to each other. In such a case, the images are switched very frequently if the setting is made such that the images are switched according to the movement of the object, and thus the image which is hardly understandable to the audience will be displayed. Further, also in a case where an image-capturing angle of the display image is changed drastically and repeatedly, the image which is hardly understandable to the audience will be displayed.

SUMMARY

Aspects of the present invention are generally directed to a system that displays an image which is easily understandable to an audience, while displaying an image the audience is highly interested in.

According to an aspect of the present invention, an information processing apparatus includes a selection unit configured to select, from among the images captured by a plurality of image-capturing apparatuses, an image having a high evaluation value with respect to content of the image as an image to be displayed on a display apparatus and a correction unit configured to make a correction to heighten the evaluation value of the image selected by the selection unit and currently displayed on the display apparatus, wherein the selection unit selects an image to be displayed on the display apparatus using an evaluation value that reflects the correction executed by the correction unit.

Further features of the present disclosure will become apparent from the following description of exemplary embodiments with reference to the attached drawings.

BRIEF DESCRIPTION OF THE DRAWINGS

FIG. 6 is a table illustrating gaze regions.

FIGS. 10A, 10B, and 10C are graphs each illustrating an example of transition in a calculation result of a display appropriateness value.

FIGS. 13A, 13B, and 13C are graphs illustrating an example of transition in a calculation result of a display appropriateness value according to the second exemplary embodiment.

FIG. 17 is a diagram illustrating an example of a data format of image information according to the third exemplary embodiment.

FIGS. 18A, 18B, and 18C are graphs each illustrating an example of transition in a calculation result of a display appropriateness value according to the third exemplary embodiment.

DESCRIPTION OF THE EMBODIMENTS

Hereinafter, an exemplary embodiment will be described with reference to the appended drawings.

Figure 1:
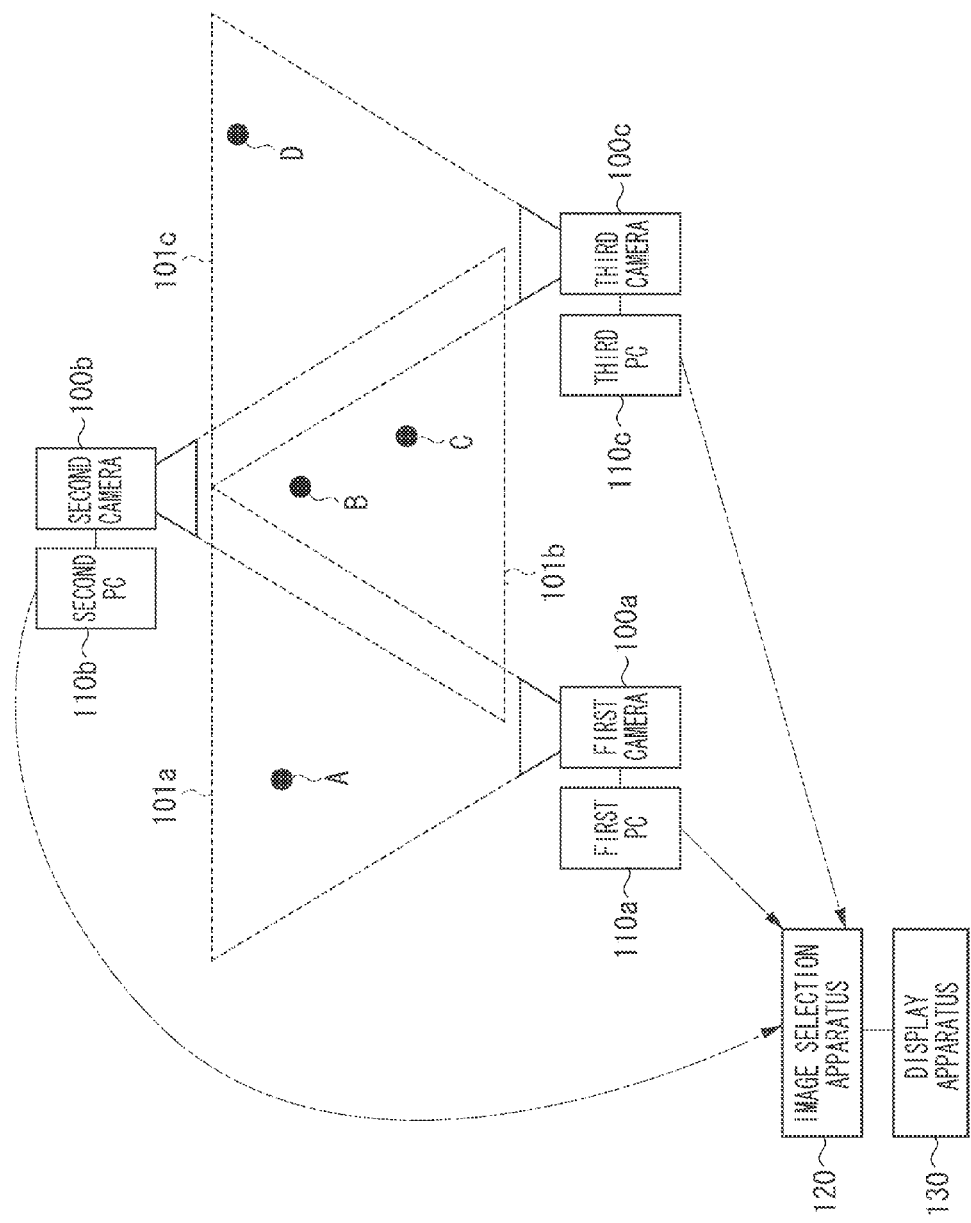
FIG. 1 is a diagram illustrating an image-capturing system according to a first exemplary embodiment.

A first exemplary embodiment will be described below. FIG. 1 is a diagram illustrating an image-capturing system serving as an information processing system according to the present exemplary embodiment. A first camera 100a, a second camera 100b, and a third camera 100c respectively capture images in a first image-capturing region 101a, a second image-capturing region 101b, and a third image-capturing region 101c. The first image-capturing region 101a, the second image-capturing region 101b, and the third image-capturing region 101c are adjacent to each other in that order. The first camera 100a, the second camera 100b, and the third camera 100c transmit the captured images to a first personal computer (PC) 110a, a second PC 110b, and a third PC 110c respectively, which are connected to the corresponding cameras through wired or wireless connection. In addition, the first camera 100a, the second camera 100b, and the third camera 100c are cameras of an identical type installed at different installation positions. Hereinafter, the first camera 100a, the second camera 100b, and the third camera 100c are referred to as cameras 100a, 100b, and 100c, respectively. Further, each of the cameras 100a to 100c is simply referred to as a camera 100 when it is not necessary to distinguish among the cameras 100a to 100c. Furthermore, the first PC 110a, the second PC 110b, and the third PC 110c are of an identical type. Hereinafter, the first PC 110a, the second PC 110b, and the third PC 110c are referred to as PCs 110a, 110b, and 110c, respectively. Furthermore, each of the PCs 100a to 100c is simply referred to as a PC 110 when it is not necessary to distinguish among the PCs 110a to 110c.

Based on the images received from the corresponding cameras 100a to 100c, the PCs 110a to 110c generate image information used to determine an image that is to be preferentially displayed from among the images captured by the cameras 100a to 100c. Specifically, each of the PCs 110a to 110c extracts a gaze region from a received image and calculates an importance value of the gaze region, i.e., a region importance value. Then, each of the PCs 110a to 110c generates image information including the image and the region importance value and transmits the image information to an image selection apparatus 120. The gaze region is a region that draws a user's attention.

In the present exemplary embodiment, as illustrated in FIG. 1, a gaze region A is extracted from the first image-capturing region 101a, gaze regions B and C are extracted from the second image-capturing region 101b, and a gaze region D is extracted from the third image-capturing region 101c. Further, the number of gaze regions extracted from a single image captured by each of the cameras 100a to 100c may be one or may be more than one. In addition, extraction processing of a gaze region will not be performed when a gaze region does not exist in the image. Based on the image information, the image selection apparatus 120 selects a display image that is to be displayed on a display apparatus 130 from among a plurality of images captured by the cameras 100a to 100c. In addition, the number of cameras 100 and the number of corresponding PCs 110 are not limited to those described in the present exemplary embodiment.

Figure 2:
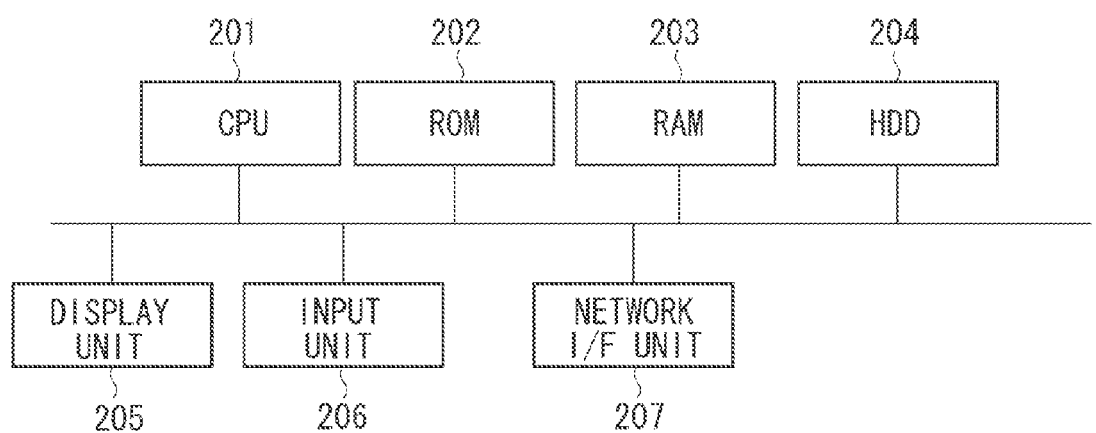
FIG. 2 is a diagram illustrating a hardware configuration of a personal computer (PC).

FIG. 2 is a diagram illustrating a hardware configuration of the PC 110. The PC 110 includes a central processing unit (CPU) 201, a read only memory (ROM) 202, a random access memory (RAM) 203, a hard disk drive (HDD) 204, a display unit 205, an input unit 206, and a network interface (I/F) unit 207. The CPU 201 reads a control program stored in the ROM 202 to execute various kinds of processing. The RAM 203 is used as a temporary storage region of the CPU 201 such as a main memory or a work area. The HDD 204 stores various kinds of information such as image data and various programs. The display unit 205 displays various kinds of information. The input unit 206 includes a keyboard and a mouse, and receives various operations from a user.

The network I/F unit 207 executes communication processing with an external apparatus such as an image forming apparatus via a network. Ethernet (registered mark) may be provided as an example of the network. Further, the network I/F unit 207 may communicate with the external apparatus through a wireless network instead of Ethernet (registered mark). Furthermore, below-described functions and processing executed by the PC 110 are realized when the CPU 201 reads and executes a program stored in the ROM 202 or the HDD 204.

Hardware configurations of the image selection apparatus 120 and the display apparatus 130 are almost the same as the hardware configuration of the PC 110. Further, a hardware configuration of the camera 100 is approximately the same as the hardware configuration of the PC 110, however, the camera 100 includes a secure digital (SD) card instead of the HDD 204. In addition, the camera 100 further includes an image capturing unit.

Figure 3:
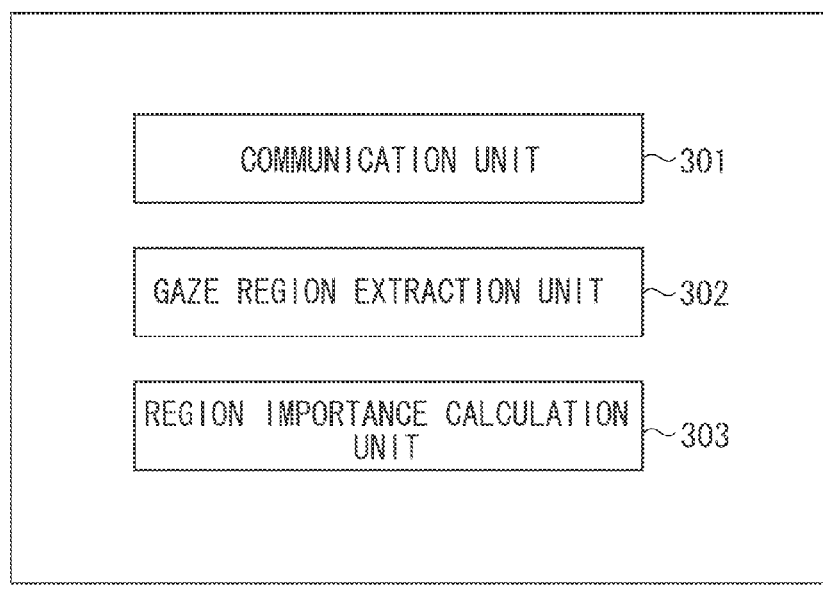
FIG. 3 is a diagram illustrating a software configuration of the PC.

FIG. 3 is a diagram illustrating a software configuration of the PC 110. A communication unit 301 communicates with an external apparatus. For example, the communication unit 301 transmits a processing result acquired by a below-described gaze region extraction unit 302 or a region importance calculation unit 303 to the image selection apparatus 120. The gaze region extraction unit 302 extracts a gaze region from the image received from the camera 100. The region importance calculation unit 303 calculates a region importance value of the gaze region extracted by the gaze region extraction unit 302. The gaze region and the region importance value will be described below in detail.

Figure 4:
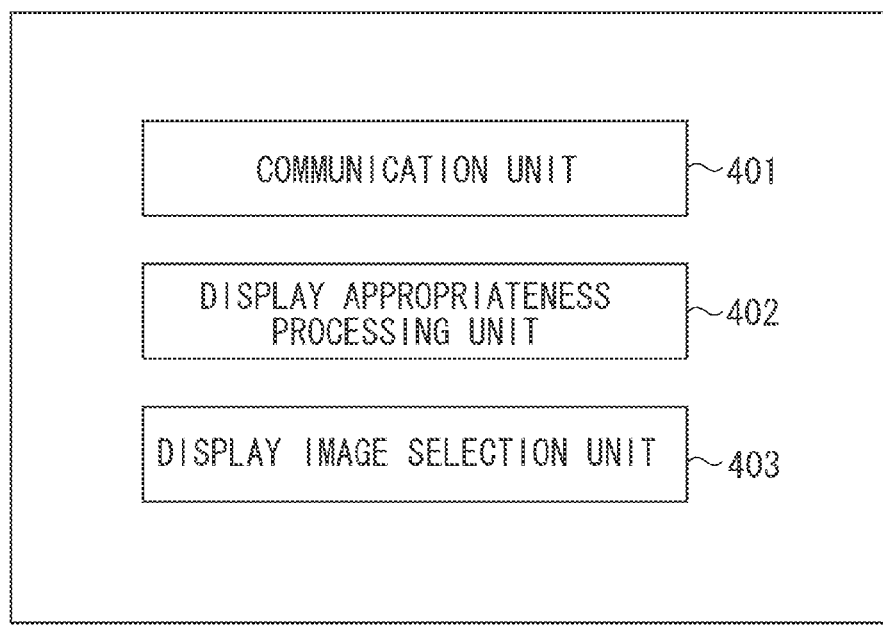
FIG. 4 is a diagram illustrating a software configuration of an image selection apparatus.

FIG. 4 is a diagram illustrating a software configuration of the image selection apparatus 120. A communication unit 401 communicates with an external apparatus. A display appropriateness processing unit 402 calculates a display appropriateness value of the image acquired from each of the cameras 100a to 100c based on the information the communication unit 401 receives from the PC 110. Herein, the display appropriateness value is an evaluation value for determining whether the image is appropriate to be displayed on the display apparatus 130. The display appropriateness value is greater when the image is more appropriate to be displayed on the display apparatus 130. A display image selection unit 403 selects an image (i.e., display image) that is to be displayed on the display apparatus 130 based on the display appropriateness value of each image.

Figure 5:
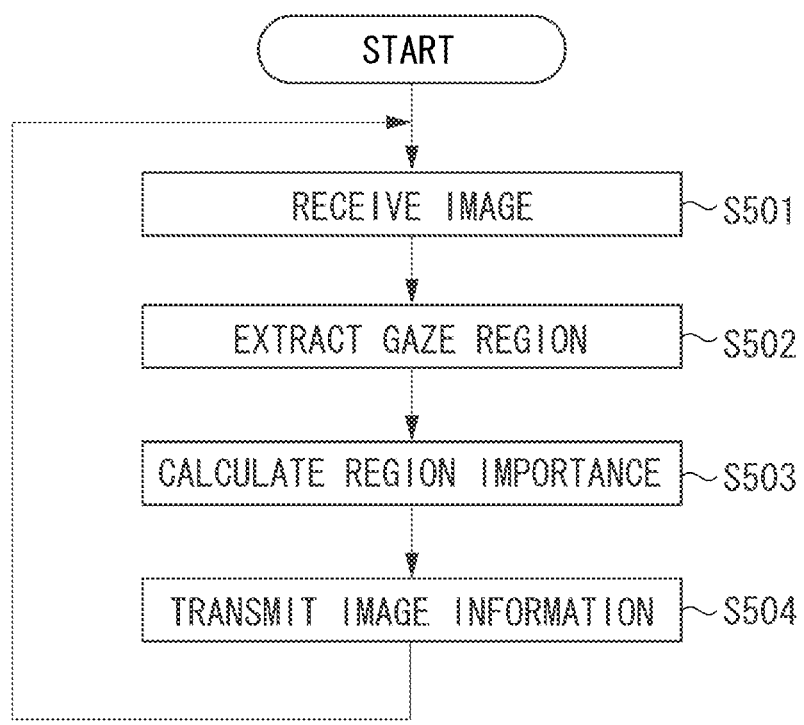
FIG. 5 is a flowchart illustrating image analysis processing executed by the PC.

FIG. 5 is a flowchart illustrating image analysis processing executed by the PC 110. In step S501, the communication unit 301 of the PC 110 receives an image from the corresponding camera 100 via the network I/F unit 207. Next, in step S502, the gaze region extraction unit 302 executes image recognition processing on the received image and extracts a gaze region. For example, the PC 110 stores a gaze region table 600 illustrated in FIG. 6 in the HDD 204. The gaze region table 600 stores types of gaze regions to be extracted. The gaze region table 600 further stores type importance values to be allocated to respective types of gaze regions in association with the types thereof. The type importance value represents an importance of the gaze region which is determined according to the type of the gaze region. For example, the type and the type importance value of the gaze region are previously set by a manager through an input operation using the input unit 206.

Then, the gaze region extraction unit 302 extracts a gaze region based on the types stored in the gaze region table 600. As illustrated in FIG. 6, in the present exemplary embodiment, the gaze region extraction unit 302 extracts as a gaze region a target object such as a ball, a player, or a specific play in a sports game. The gaze region extraction unit 302 extracts a rectangular region including the extraction target such as a ball or a player as a gaze region through the image recognition processing. Further, the gaze region extraction unit 302 extracts a series of actions such as shooting and passing as a gaze region. In this case, the gaze region extraction unit 302 recognizes actions of a player based on a change in a player's posture or a positional relationship between the player and a ball. The gaze region extraction unit 302 extracts either or both of rectangular regions, that is, a region around the ball when the game starts, and a region around the ball in a predicted landing position as a gaze region. As an example, techniques described in the following two documents may be referred with respect to the predicted ball landing position.

1. Kihwan Kim, et al., "Detecting Regions of Interest in Dynamic Scenes with Camera Motions", CVPR 2012, June 2012.

2. Kihwan Kim, et al., "Motion Field to Predict Play Evolution in Dynamic Sport Scenes", CVPR 2010, June 2010.

In the present exemplary embodiment, description will be given of a gaze region when a sports image is a processing target, however, types of processing-target images and types of gaze regions to be extracted are not limited to those described in the present exemplary embodiment. Further, types of processing-target images and gaze regions to be extracted may be freely set or changed by the manager. Furthermore, a detection method of the gaze region and a determination method of a shape and a size of the gaze region are not limited to those described in the present exemplary embodiment.

The processing will be further described with reference to FIG. 5 again. After the processing in step S502, in step S503, the region importance calculation unit 303 calculates an image-capturing angle appropriateness value of the processing-target gaze region through the image recognition processing. For example, in a case where a gaze region of a player is a processing target, the region importance calculation unit 303 detects an angle at which a front face of the player is captured through the image recognition processing, and calculates the image-capturing angle appropriateness value based on the detection result. The angle appropriateness value is an example of the appropriateness value of the gaze region as a target to be browsed by the user. The region importance calculation unit 303 further calculates an area of the gaze region through image processing of the processing-target gaze region. Furthermore, the region importance calculation unit 303 refers to the gaze region table 600 and specifies a type importance value associated with the type of the processing-target gaze region.

Then, based on the type importance value, the angle appropriateness value, and the area of the gaze region, the region importance calculation unit 303 calculates the region importance value of each gaze region. Specifically, the region importance calculation unit 303 calculates a region importance value I based on the following formula 1:

$$I = i \times s \times a \qquad \text{FORMULA 1}$$

Herein, "i" represents a type importance value registered on the gaze region table 600, "s" represents an area of the extracted gaze region, and "a" represents an angle appropriateness value of the extracted image-capturing region. In addition, the region importance value may be determined by at least one of the type of the gaze region, the angle appropriateness value, and the area. A specific value thereof is not limited to the value described in the present exemplary embodiment. In addition to the above, the region importance value may be determined by an index related to a gaze region other than the type of gaze region, the angle appropriateness value, and the area.

Figure 7:
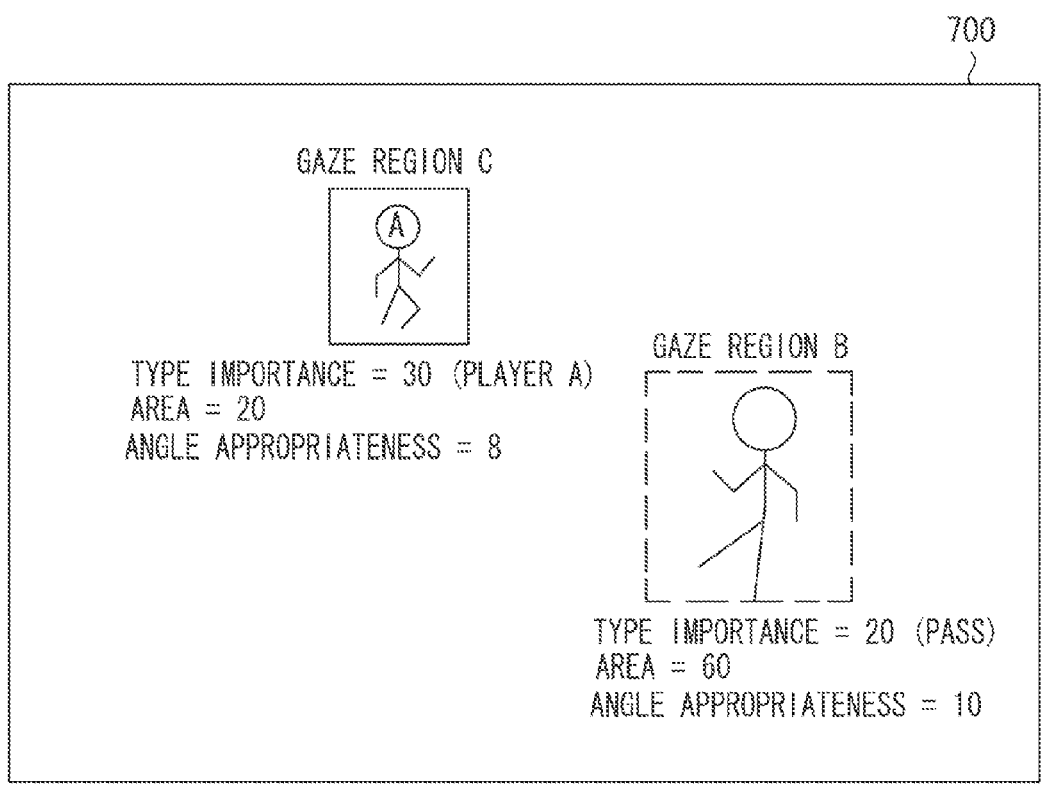
FIG. 7 is a diagram illustrating an example of an image.

FIG. 7 is a diagram illustrating an example of an image 700 captured by the second camera 100b. The image 700 includes two gaze regions B and C. In this case, in step S502, the gaze region extraction unit 302 of the second PC 110b extracts two types of gaze regions B and C respectively categorized as "PASS" and "PLAYER A". Then, in step S503, with respect to the gaze region B, the region importance calculation unit 303 refers to the gaze region table 600 and obtains 20 as a type importance value associated with the gaze region type "PASS". Further, the region importance calculation unit 303 calculates an area and an angle appropriateness value through the image processing executed on the gaze region B, thereby obtaining 60 and 10, respectively. In this case, with respect to the gaze region B, the region importance calculation unit 303 acquires 12000 as a region importance value through the formula 1 (i.e., 20×60×10=12000). Further, with respect to the gaze region C, the region importance calculation unit 303 refers to the gaze region table 600 and obtains 30 as a type importance value associated with the gaze region type "PLAYER A". Furthermore, the region importance calculation unit 303 calculates an area and an angle appropriateness value through the image processing executed on the gaze region C, thereby obtaining 20 and 8, respectively. In this case, with respect to the gaze region C, the region importance calculation unit 303 acquires 4800 as a region importance value through the formula 1 (i.e., 30×20×8=4800).

Figure 8:
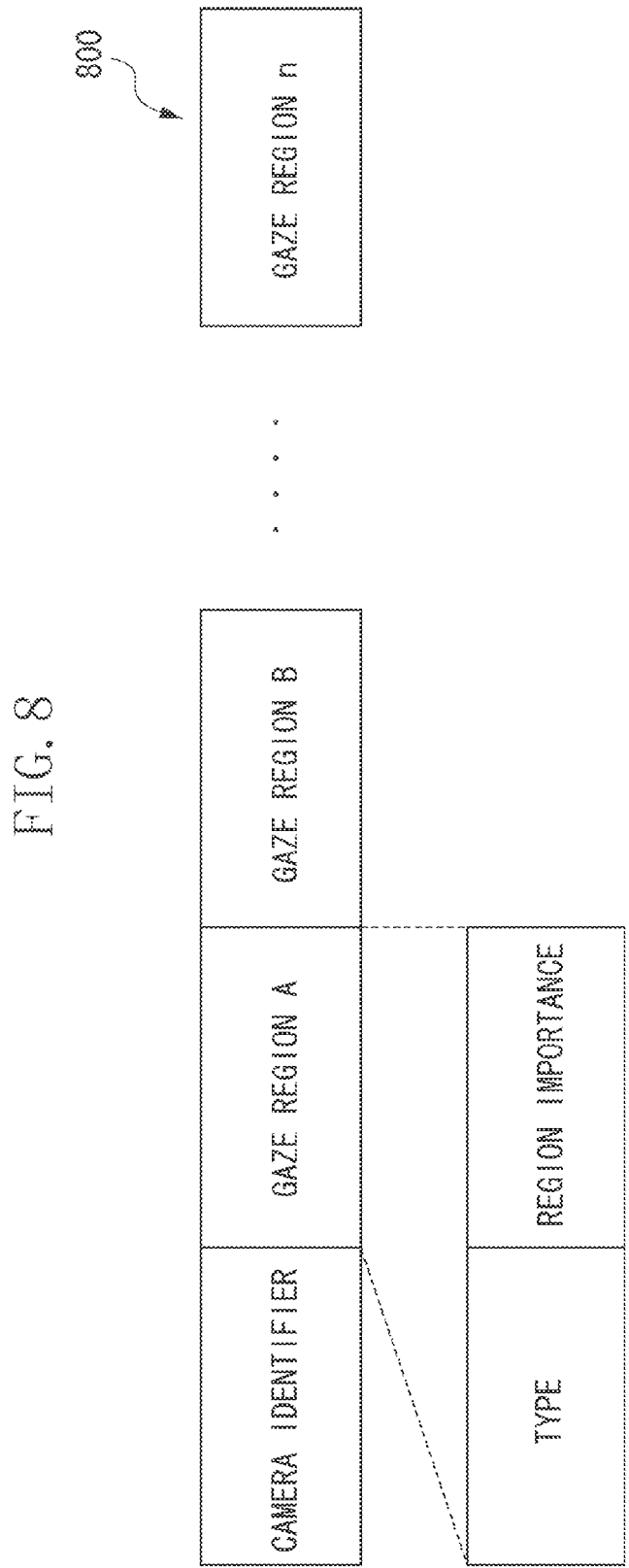
FIG. 8 is a diagram illustrating an example of a data format of image information.

The processing will be further described with reference to FIG. 5. After the processing in step S503, in step S504, the communication unit 301 transmits the image information to the image selection apparatus 120. FIG. 8 is a diagram illustrating an example of a data format of image information 800. The image information 800 associates a camera identifier for identifying the camera 100 that captures an image with a gaze region extracted from that image. In a case where a plurality of gaze regions is extracted from a single image, all of the extracted gaze regions are associated with the camera identifier. In other words, a letter "n" illustrated in FIG. 8 represents number of gaze regions extracted from the image. Further, each of the gaze regions includes the type of gaze region and the region importance value.

Figure 9:
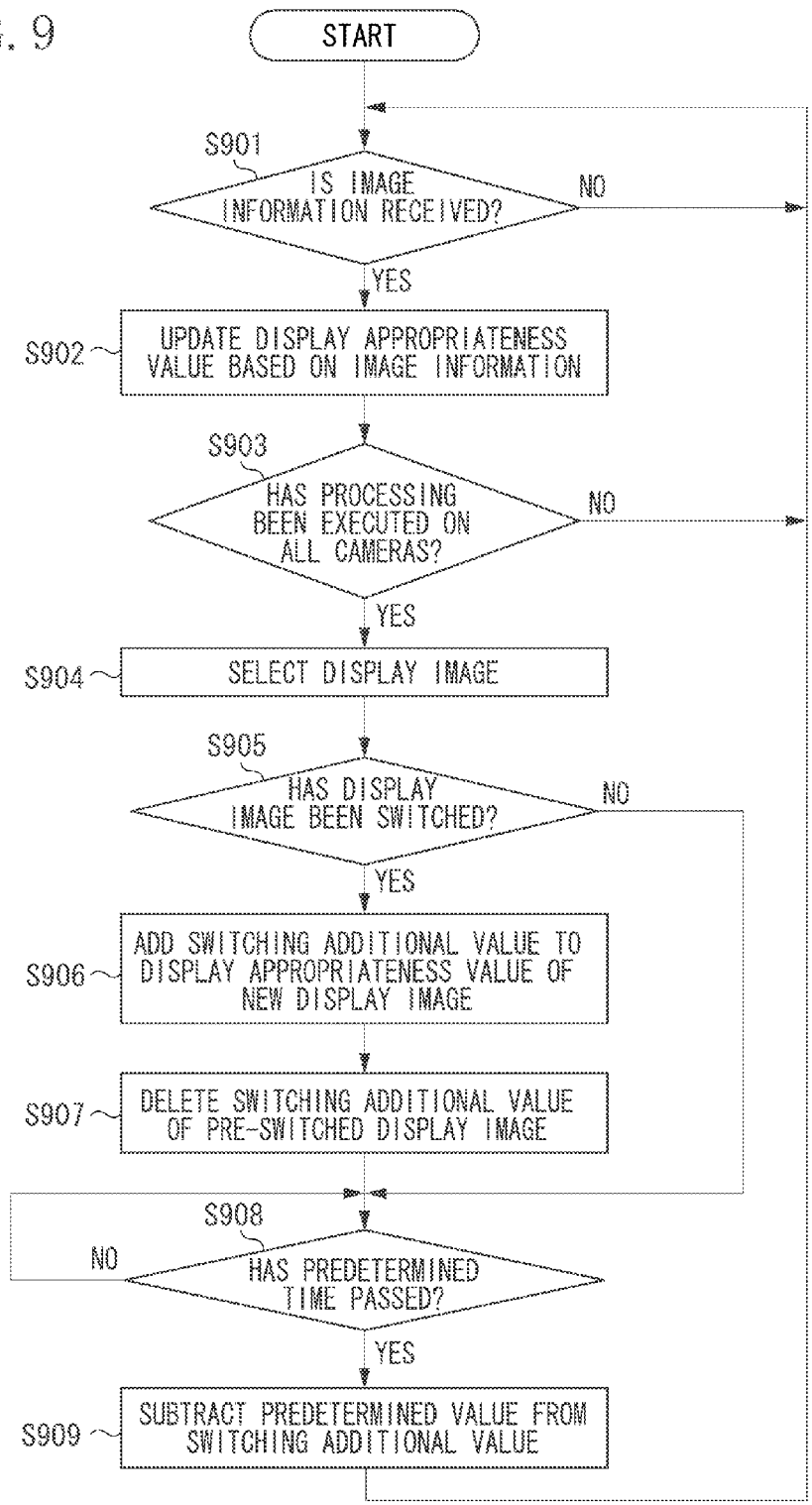
FIG. 9 is a flowchart illustrating display image selection processing.

FIG. 9 is a flowchart illustrating display image selection processing executed by the image selection apparatus 120. In step S901, the communication unit 401 of the image selection apparatus 120 waits until the image information is received from the camera 100. When the communication unit 401 receives the image information (YES in step S901), the processing proceeds to step S902. In step S902, the display appropriateness processing unit 402 allocates the region importance value included in the image information received from the PC 110 to each of the cameras 100a to 100c based on the camera identifier associated therewith. Then, the display appropriateness processing unit 402 updates the display appropriateness value of the image acquired from each of the cameras 100a to 100c. Specifically, the display appropriateness processing unit 402 adds the region importance value included in the image information to the display appropriateness value to acquire a new display appropriateness value. The display appropriateness value is initially set to "0". In a case where a plurality of gaze regions is extracted from a single image and thus the image information includes a plurality of gaze regions, the display appropriateness processing unit 402 calculates a total of the region importance values of all the gaze regions included in the image information as the image importance value (i.e., image importance value calculation processing). Then, the display appropriateness processing unit 402 adds the calculated region importance value to the display appropriateness value. For example, in the example illustrated in FIG. 7, the region importance value of 12000 for the gaze region B and the region importance value of 4800 for the gaze region C are added together, so that the display appropriateness value for the second camera image acquired by the second camera 100b is 16800 (i.e., 12000+4800=16800).

Next, in step S903, the display appropriateness processing unit 402 determines whether the processing has been completed on all of the gaze regions included in a single piece of image information 800. If the processing has been completed (YES in step S903), the processing proceeds to step S904. If the processing has not been completed (NO in step S903), the processing returns to step S901. In step S904, the display image selection unit 403 selects an image having the greatest display appropriateness value as a display image and generates selection information indicating the selected display image. Then, the communication unit 401 transmits the selection information to the display apparatus 130. The display apparatus 130 displays the image indicated by the selection information. Specifically, the display apparatus 130 receives the image indicated by the selection information from the PC 110 corresponding to the camera 100 that captures the image. Furthermore, for example, in a case where the image selection apparatus 120 stores the image, the display apparatus 130 may receive the image indicated by the selection information from the image selection apparatus 120.

Next, in step S905, the display appropriateness processing unit 402 determines whether the display image selected in step S904 has been switched to an image different from the image selected as a display image when the processing is executed. If the display image has been switched (YES in step S905), the processing proceeds to step S906. If the display image has not been switched (NO in step S905), the processing proceeds to step S908.

In step S906, the display appropriateness processing unit 402 adds a switching additional value to the display appropriateness value of the display image newly selected in the previous processing of step S904 to update the display appropriateness value. The switching additional value is a value to be added to the display appropriateness value of the image newly selected as the display image, which is previously stored in the HDD 204. Next, in step S907, the display appropriateness processing unit 402 reduces to "0" the switching additional value added to the display appropriateness value of the image of the last action that has been selected as a display image before the display image is selected in step S904. As described above, by executing the processing in steps S906 and S907, the image selection apparatus 120 can add the switching additional value to only the display appropriateness value of the display image currently displayed on the display apparatus 130.

Next, in step S908, the display appropriateness processing unit 402 waits until a predetermined time elapses after the time when the processing in step S904 or the previous processing in step S909 is executed. When the predetermined time has passed (YES in step S908), the processing proceeds to step S909. For example, a predetermined time may be an arbitrary value previously set and stored in the HDD 204. In step S909, the display appropriateness processing unit 402 subtracts a predetermined value from the switching additional value added to the display appropriateness value of the display image. Thereafter, the processing proceeds to step S901. For example, a predetermined value may be a value previously determined and stored in the HDD 204.

As described above, the switching additional value decreases as time passes. Therefore, at the time when the image is selected as a display image, that image is more likely to be selected as a display image in comparison to other images because of the switching additional value added thereto. Then, after the display image is displayed, a priority level of the display image becomes lower as the switching additional value gradually decreases, so that other images are more likely to be selected as a display image.

Further, a method for reducing the switching additional value with respect to passage of time is not limited to the method described in the present exemplary embodiment. In addition to the above example, the display appropriateness processing unit 402 may be configured to reduce the switching additional value so that a decrease rate becomes larger as time passes.

Figure 10B:
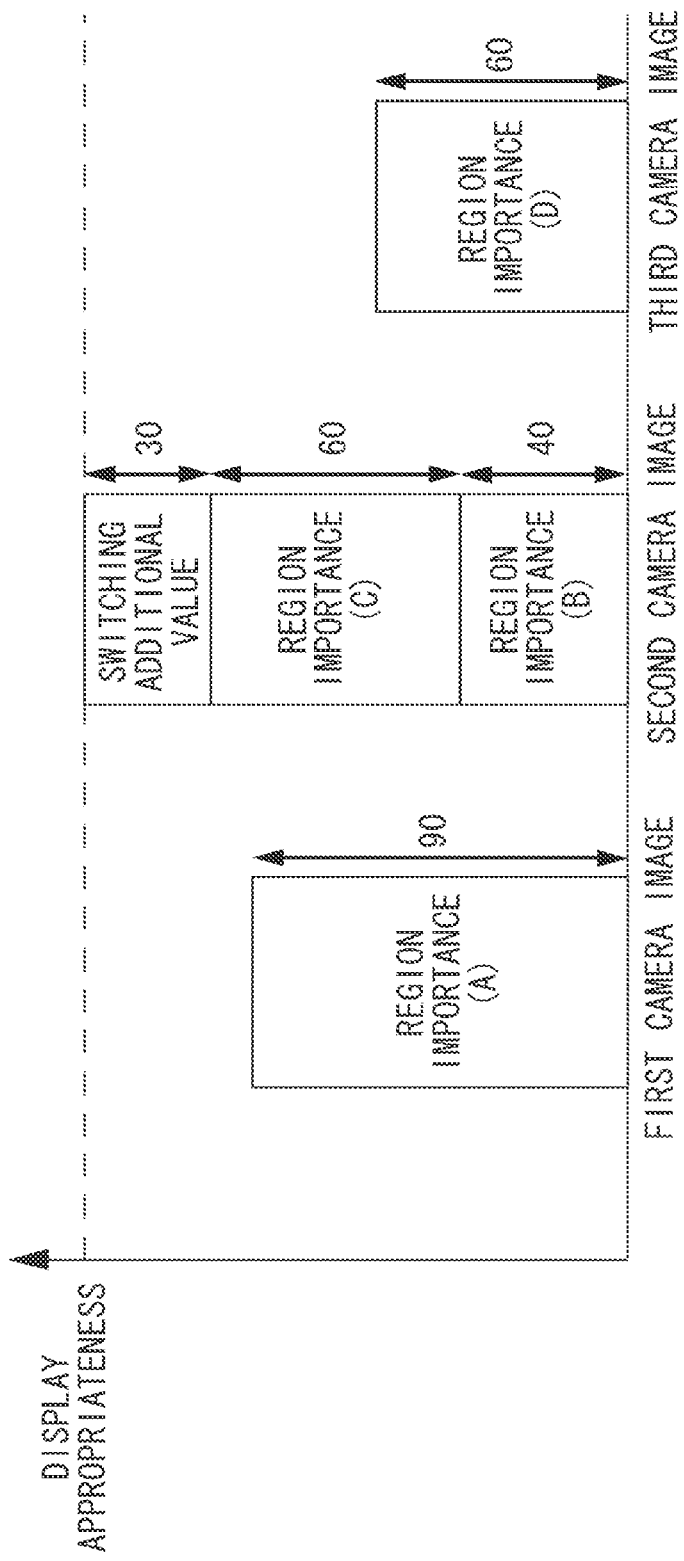

FIGS. 10A to 10C are graphs illustrating an example of transition in a calculation result of a display appropriateness value. FIG. 10A is a graph illustrating display appropriateness values of images acquired by the cameras 100a to 100c, respectively, which are calculated at a time t. The first camera image captured by the first camera 100a includes a gaze region A, and the region importance value for the gaze region A is 90. In this case, the image importance value for the first camera image is 90, and the display appropriateness value for the first camera image is also 90.

The second camera image captured by the second camera 100b includes gaze regions B and C, and the region importance values for the gaze regions B and C are both 40. In this case, the image importance value for the second camera image is 80, and the display appropriateness value for the second camera image is also 80. Further, the third camera image captured by the third camera 100c includes a gaze region E, and the region importance value for the gaze region E is 60. In this case, the image importance value for the third camera image is 60, and the display appropriateness value for the third camera image is also 60. In other words, at the time t, the first camera image has the greatest display appropriateness value, so that the first camera image is selected as a display image. Then, the switching additional value is added to the display appropriateness value for the first camera image.

FIG. 10B is a graph illustrating display appropriateness values for camera images, which are calculated at a time $t+\Delta t1$, i.e., when a period of time $\Delta t1$ has passed since the time t. At the time $t+\Delta t1$, the switching additional value added to the display appropriateness value for the first camera image is reduced to zero as time lapses. Further, the display appropriateness value for the second camera image is increased to 100, so that the display appropriateness value thereof is greater than the display appropriateness value "90" for the first camera image. Therefore, the second camera image is selected as a display image. Thus, the switching additional value of 30 is added to the display appropriateness value for the second camera image.

FIG. 10C is a graph illustrating display appropriateness values of camera images, which are calculated at a time $t+\Delta t1+\Delta t2$. At the time $t+\Delta t1+\Delta t2$, a total image importance value for the second camera image is 80. This value is smaller than the display appropriateness value of 90 for the first camera image. However, the switching additional value is added to the display appropriateness value of the second camera image, and the switching additional value at the time $t+\Delta t1+\Delta t2$ is 20. Therefore, the display appropriateness value of the second camera image is greater than that of the first camera image, so that the second camera image is continuously selected as a display image. Therefore, the display image will not be switched at the time point $t+\Delta t1+\Delta t2$.

As described above, in the image-capturing system according to the present exemplary embodiment, the switching additional value is added to the display appropriateness value of the image currently displayed on the display apparatus 130. Therefore, frequency for switching display images can be reduced in comparison to the case where the display image is simply switched according to the content of the image. Thus, the image-capturing system according to the present exemplary embodiment can provide a display image which is easily understandable to the audience, while displaying an image the audience is highly interested in.

As a first variation of the present exemplary embodiment, the cameras 100a to 100c may have functions of the PCs 110a to 110c. In such a case, each of the cameras 100a to 100c generates image information from the image and transmits the image information to the image selection apparatus 120.

Further, as a second variation of the present exemplary embodiment, each of the PCs 110a to 110c may simply transmit an image to the image selection apparatus 120 without generating image information from the image. In such a case, the image selection apparatus 120 executes the processing in steps S502 and S503 described in FIG. 5 on each image in order to extract the gaze region and calculate the region importance value. As described above, the image selection apparatus 120 may execute a part of the image analysis processing in place of the PCs 110a to 110c.

Figure 11:
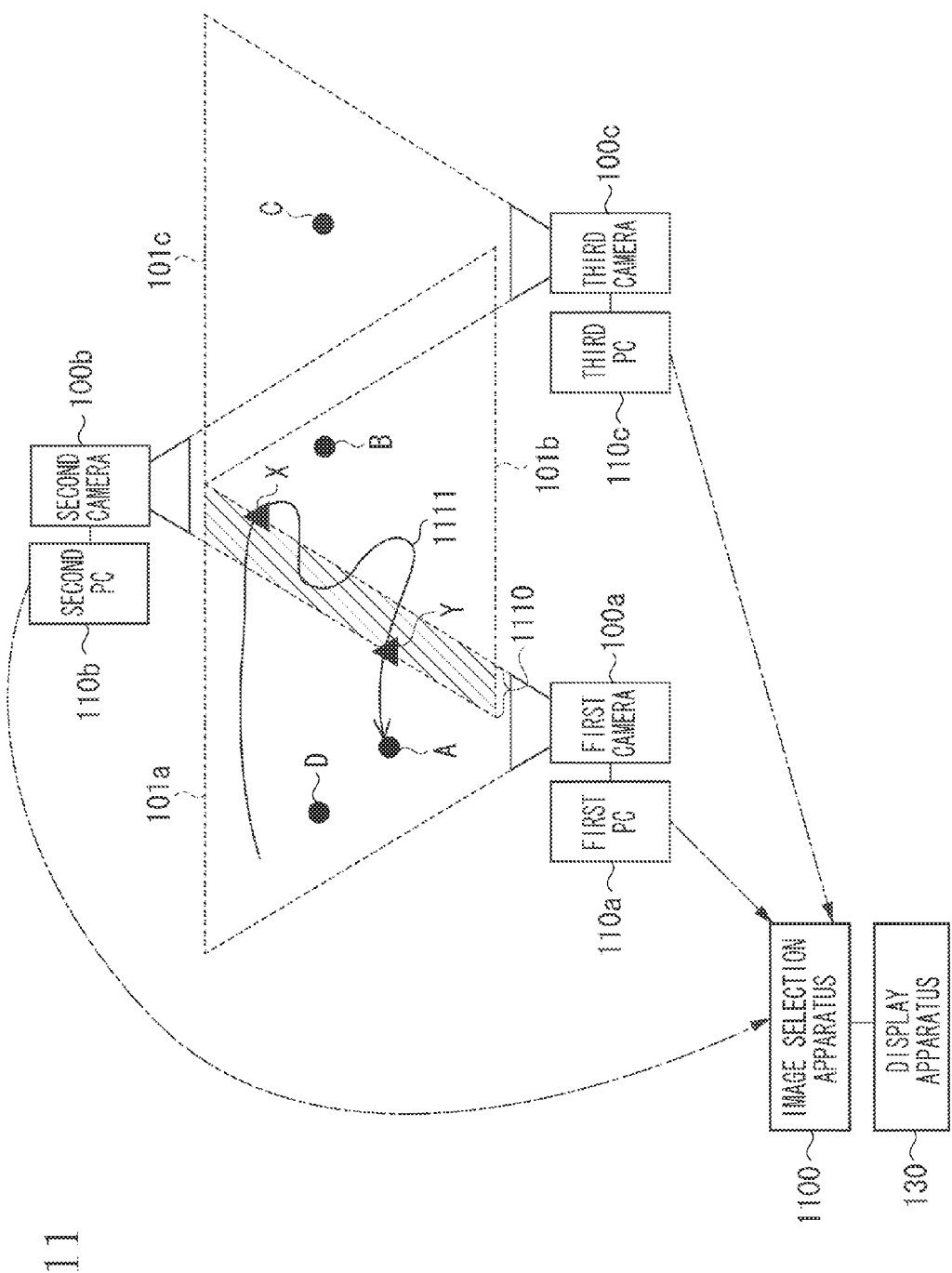
FIG. 11 is a diagram illustrating a locus of the gaze region.

Hereinafter, a second exemplary embodiment will be described. The image-capturing system according to the present exemplary embodiment properly controls switching of display images when a gaze region frequently moves among image-capturing regions of a plurality of cameras. Herein, a description is presented of a configuration of the image-capturing system according to the present exemplary embodiment that is different from the image-capturing system described in the first exemplary embodiment. FIG. 11 is a diagram illustrating a locus of the gaze region A that has moved as time has passed. As illustrated in FIG. 11, the first image-capturing region 101a and the second image-capturing region 101b partially overlap with each other. This overlapping region is referred to as an overlap region 1110. In the present exemplary embodiment, as indicated by a locus 1111, the gaze region A moves from the first image-capturing region 101a to the overlapping region 1110 and then to the second image-capturing region 101b via a switching point X. Thereafter, the gaze region A further moves to the first image-capturing region 101a via a switching point Y. The switching point X represents a position where the gaze region A moves outside the first image-capturing region 101a. The switching point Y represents a position where the gaze region A moves outside the second image-capturing region 101b.

Figure 12:
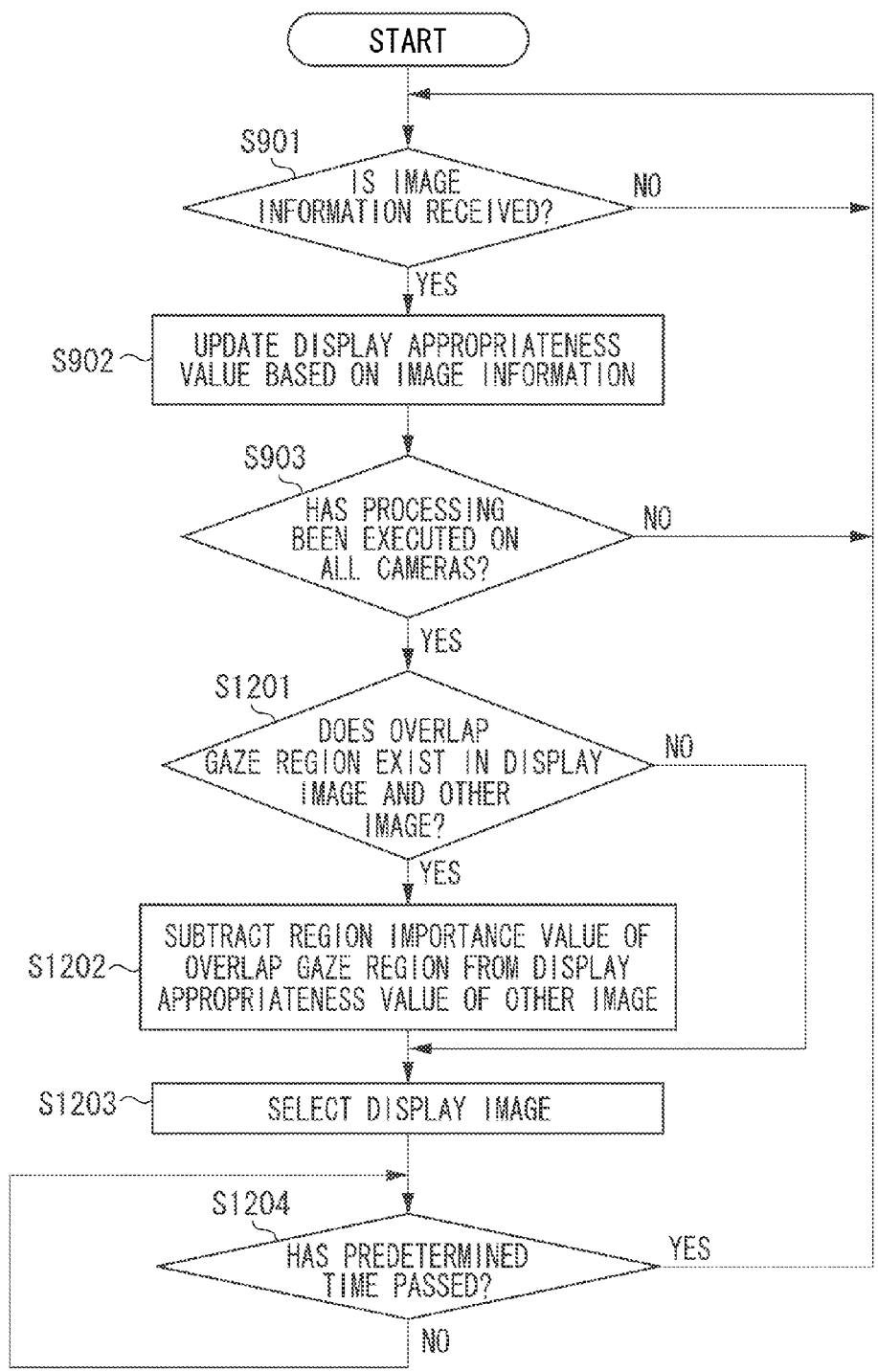
FIG. 12 is a flowchart illustrating display image selection processing according to a second exemplary embodiment.

FIG. 12 is a flowchart illustrating display image selection processing executed by an image selection apparatus 1100 according to the present exemplary embodiment. In FIG. 12, the same reference numbers are assigned to the processing steps in common with the display image selection processing described in the first exemplary embodiment. In step S903, when the processing has been completed on all of the gaze regions included in the single image information 800 (YES in step S903), the processing proceeds to step S1201. In step S1201, the display appropriateness processing unit 402 compares the type of the gaze region in the display image currently being selected with the type of the gaze region in an image other than the display image, and determines whether there is any overlap gaze region. The overlap gaze region refers to a gaze region extracted from two images, corresponding to the same gaze target. For example, when the gaze target exists in the overlap region 1110 illustrated in FIG. 11, the overlap gaze region is extracted from the first and the second camera images.

In a case where the overlap gaze region exists (YES in step S1201), the processing proceeds to step S1202. In a case where the overlap gaze region does not exist (NO in step S1201), the processing proceeds to step S1203. In step S1202, the display appropriateness processing unit 402 subtracts the region importance value calculated for the overlap gaze region from the display appropriateness value of the other image. In other words, the display appropriateness processing unit 402 uses the region importance value of the overlap gaze region existing in the display image as an addition target when calculating the image importance value. On the other hand, the display appropriateness processing unit 402 does not use the region importance value of the overlap gaze region existing in the image other than the display image as an addition target when calculating the image importance value. Next, in step S1203, the display image selection unit 403 selects an image having the greatest display appropriateness value as a display image. Next, in step S1204, the display appropriateness processing unit 402 waits until a predetermined time passes after the processing of step S1203 is executed. When the predetermined time has passed (YES in step S1204), the processing proceeds to step S901.

Figure 13A:
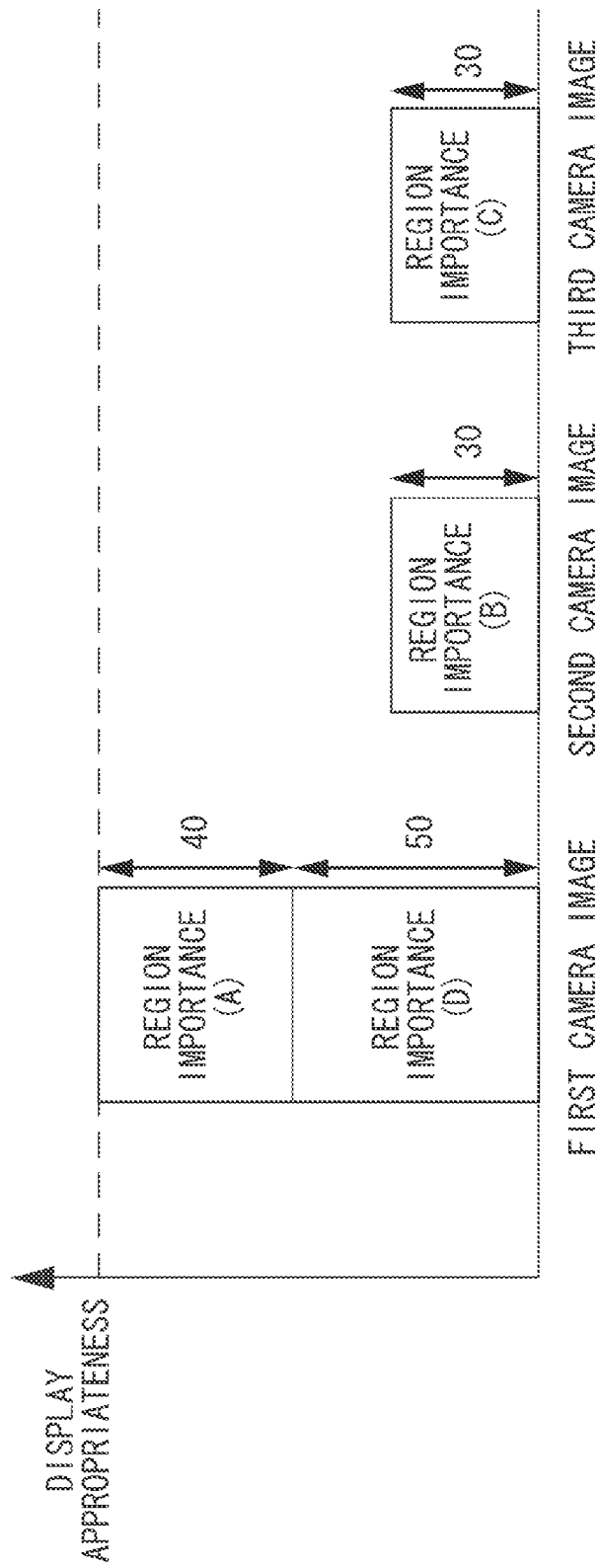

FIGS. 13A to 13C are graphs illustrating an example of transition in a calculation result of a display appropriateness value in the image-capturing system according to the present exemplary embodiment. FIG. 13A is a graph illustrating display appropriateness values of respective camera images when the gaze region A exists in the first image-capturing region 101a and has not reached the switching point X. At this time, the first camera image has the greatest display appropriateness value, so that the first camera image is selected as a display image. The gaze region A passes the overlap region 1110 before reaching the switching point X. When the gaze region A exists in the overlap region 1110, the gaze region A is extracted from images captured by the first camera 100a and the second camera 100b. However, by executing the processing in steps S1201 and S1202, the region importance value of the gaze region A is subtracted from the display appropriateness value of the second camera image which is not selected as a display image. Therefore, as illustrated in FIG. 13A, the region importance value of the gaze region A is not added to the display appropriate value of the second camera image.

FIG. 13B is a graph illustrating the display appropriateness values of respective camera images when the gaze region A is moving from the switching point X to the switching point Y. When the gaze region A passes the switching point X and moves into the second image-capturing region 101b, the gaze region A is extracted from only the second camera image. Therefore, the region importance value of the gaze region A is added to the display appropriateness value of the second camera image, while the region importance value of the gaze region A is not added to the display appropriateness value of the first camera image. Thereafter, gaze region A may move into the overlap region 1110 before reaching the switching point Y. However, the region importance value of the gaze region A is not reflected in the display appropriateness value of the first camera image because the second camera image is selected as the display image at this point.

FIG. 13C is a graph illustrating the display appropriateness values of respective camera images after the gaze region A passes the switching point Y. After passing the switching point Y, the gaze region A moves to the first image-capturing region 101a, so that the gaze region A is extracted from only the first camera image. Therefore, the region importance value of the gaze region A is added to the display appropriateness value of the first camera image, while the region importance value of the gaze region A is not added to the display appropriateness value of the second camera image. As a result, the first camera image is selected as a display image.

As described above, when the gaze region A moves along the locus 1111 as illustrated in FIG. 11, the display images are switched twice at the time when the gaze region A passes the switching point X and the switching point Y. On the contrary, if the processing in steps S1201 to S1203 is not executed, there is a possibility that the display images are switched more frequently when the gaze region A is moving from the switching point X to the switching point Y.

As described above, when the gaze region corresponding to the same gaze target is extracted from the overlapping image-capturing region, the image-capturing system according to the present exemplary embodiment adds the region importance value of the gaze region to only the display appropriateness value of the display image. With this configuration, even if the gaze region frequently moves back and forth among the image-capturing regions of a plurality of cameras, frequency of switching display images can be reduced appropriately. Therefore, the image-capturing system according to the present exemplary embodiment can provide a display image which is easily understandable to the audience, while displaying an image the audience is highly interested in. In addition, the configuration and the processing of the image-capturing system according to the present exemplary embodiment other than those described above are the same as those of the image-capturing system according to the first exemplary embodiment.

Figure 14:
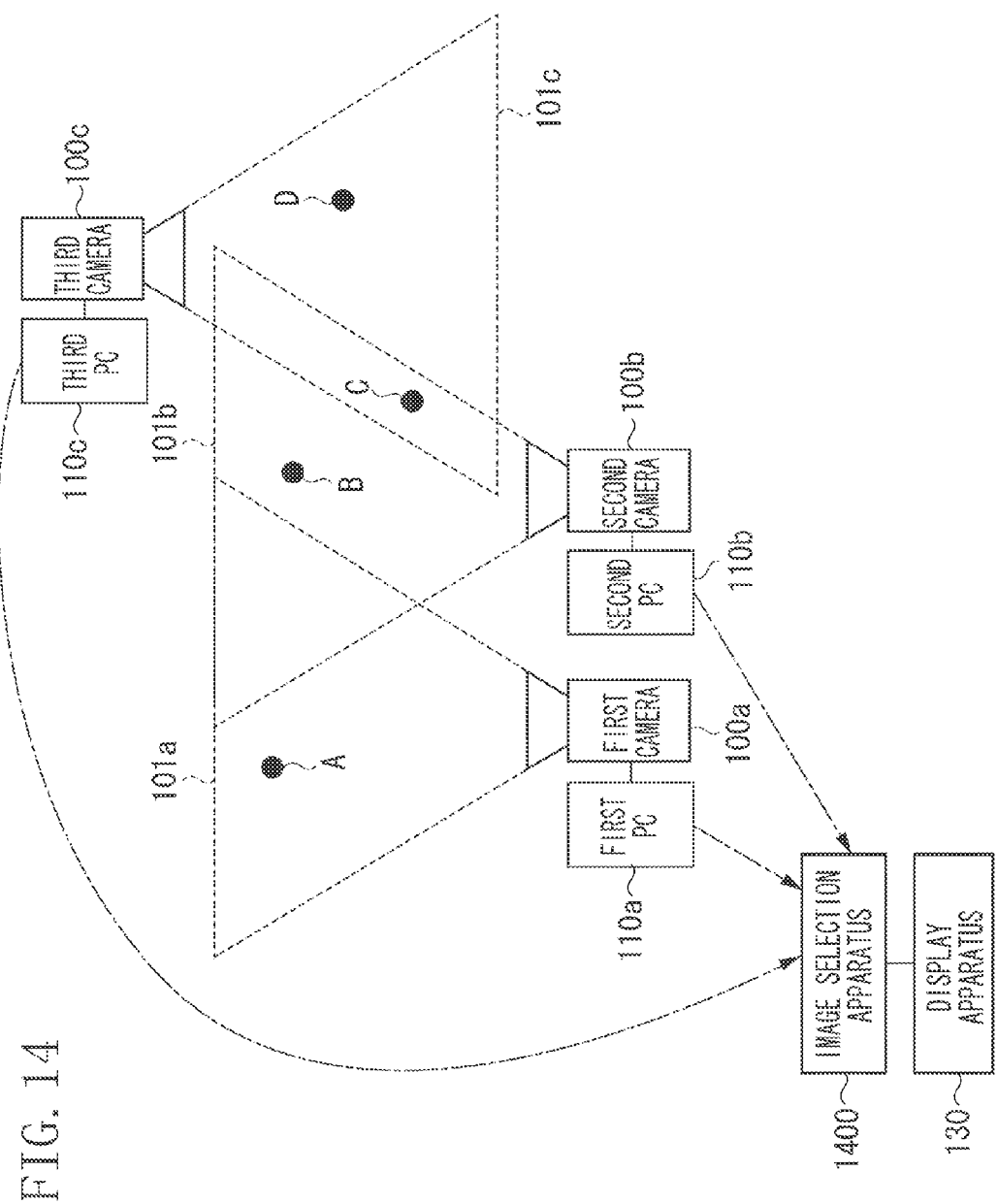
FIG. 14 is a diagram illustrating an example of an image-capturing system according to a third exemplary embodiment.

Hereinafter, a third exemplary embodiment will be described. FIG. 14 is a diagram illustrating an example of an image-capturing system according to the present exemplary embodiment. In the present exemplary embodiment, the first camera 100a and the second camera 100b are installed to capture images substantially in the same image-capturing direction, whereas the third camera 100c is installed to capture images approximately in the opposite direction to the image-capturing directions of the first camera 100a and the second camera 100b. Further, the first image-capturing region 101a, the second image-capturing region 101b, and the third image-capturing region 101c are adjacent to each other in that order. In such a case, although the third image-capturing region 101c is adjacent to the second image-capturing region 101b, the image-capturing directions thereof are opposite from each other. Therefore, when the second camera image is switched to the third camera image, the audience is more strongly aware of the change in the display images in comparison to the case where the first camera image is switched to the second camera image. Therefore, the image-capturing system according to the present exemplary embodiment properly controls switching of display images when the image-capturing direction is changed drastically.

Figure 15:
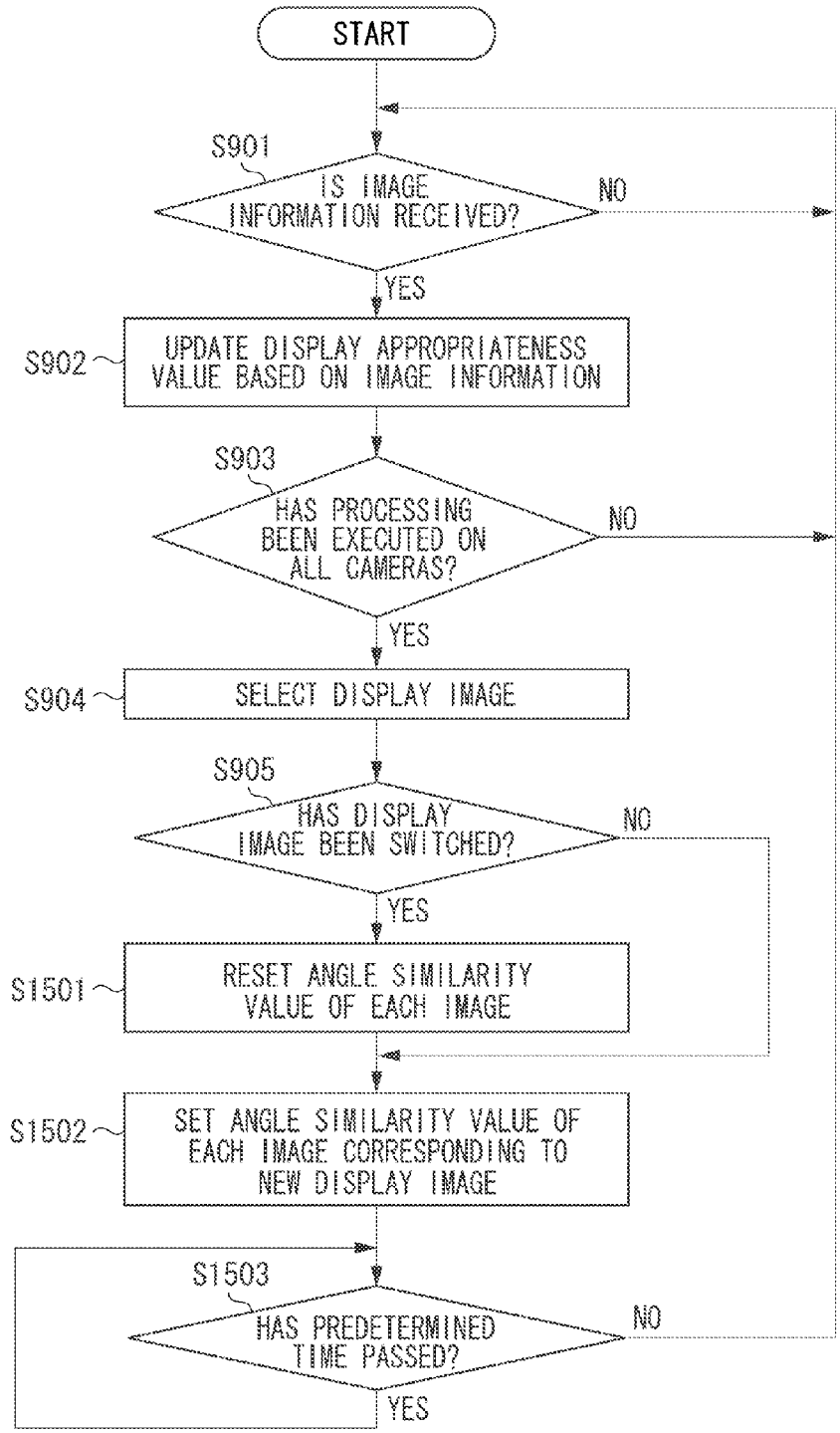
FIG. 15 is a flowchart illustrating display image selection processing according to the third exemplary embodiment.

FIG. 15 is a flowchart illustrating display image selection processing executed by an image selection apparatus 1400 according to the present exemplary embodiment. In FIG. 15, the same reference numbers are assigned to the processing steps in common with those of the display image selection processing described in the first exemplary embodiment. In step S905, if the display images are switched (YES in step S905), the processing proceeds to step S1501. In step S1501, the display appropriateness processing unit 402 resets and initializes an angle similarity value set to each camera image to "0". Next, in step S1502, the display appropriateness processing unit 402 sets the angle similarity value of each camera image, corresponding to the newly selected display image. Then, the display appropriateness processing unit 402 adds the angle similarity value to the display appropriateness value as an angle additional value. Next, in step S1503, the display appropriateness processing unit 402 waits until a predetermined time passes after the processing of step S1502 is executed. When a predetermined time has passed (YES in step S1503), the processing proceeds to step S901.

The angle similarity value will be described below. The angle similarity value is an index value indicating similarity of the image-capturing region or the image-capturing direction between the display image and an image other than the display image, and the angle similarity value is determined based on the image-capturing direction and the image-capturing region (position). The display appropriateness processing unit 402 sets the greatest value to the angle similarity value for the display image. Further, the display appropriateness processing unit 402 sets a smaller angle similarity value to the other image when difference between the image-capturing directions of the other image and the display image becomes greater, or a distance between the image-capturing positions of the other image and the display image becomes longer.

Figure 16:
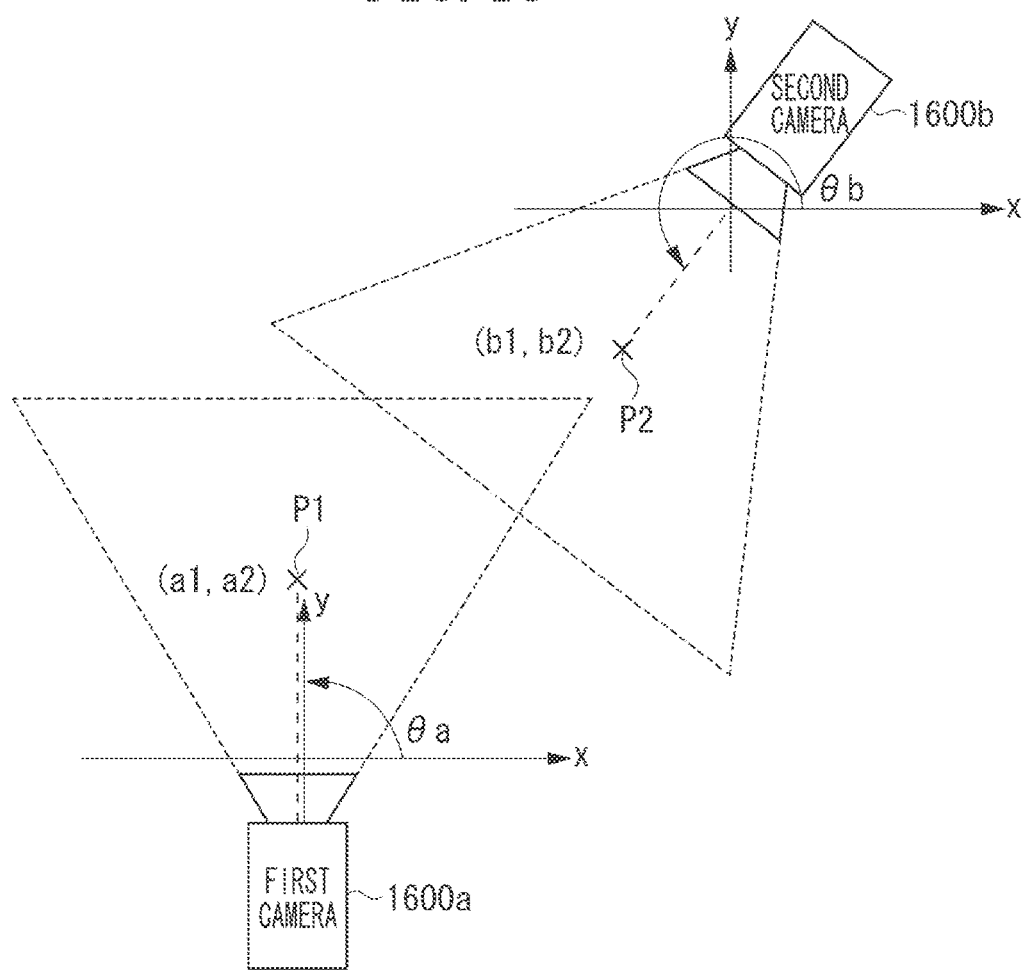
FIG. 16 is an explanatory diagram illustrating angle similarity.

FIG. 16 is an explanatory diagram illustrating the angle similarity. In FIG. 16, of the two cameras (i.e., a first camera 1600a and a second camera 1600b), a first camera image captured by the first camera 1600a is selected as a display image. An image-capturing position P1 of the first camera 1600a is placed away from the center of an image-capturing lens of the first camera 1600a by a predetermined distance in the image-capturing direction. An image-capturing position P2 of the second camera 1600b is placed away from the center of an image-capturing lens of the second camera 1600b by a predetermined distance in the image-capturing direction. In FIG. 16, the coordinates of the image-capturing positions P1 and P2 are expressed as (a1, b1) and (a2, b2), respectively. Further, a reference direction is specified as "x-axis" in FIG. 16, and an angle between the reference direction and the image-capturing direction of the first camera 1600a is expressed as "θa" whereas an angle between the reference direction and the image-capturing direction of the second camera 1600b is expressed as "θb".

When the first camera image captured by the first camera 1600a is selected as a display image, the angle similarity value α of another camera image (herein, the second camera image captured by the second camera 1600b) with respect to the display image can be calculated through the following formula 2:

$$\alpha = C - D \times \sqrt{(a_1-b_1)^2 - (a_2-b_2)^2} \times \varphi \qquad \text{FORMULA 2}$$

$$\varphi = \begin{cases} |\theta_a - \theta_b|, & |\theta_a - \theta_b| \le \pi \\ 2\pi - |\theta_a - \theta_b|, & |\theta_a - \theta_b| > \pi \end{cases}$$

Herein, the angle is expressed in a measurement unit of "radian", and values C and D are positive real constants arbitrarily assigned thereto. In the formula 2, the angle similarity value of the display image is the greatest value C.

FIG. 17 is a diagram illustrating an example of a data format of image information according to the present exemplary embodiment. In addition to the information included in the image information according to the first exemplary embodiment, the image information according to the present exemplary embodiment further includes an image-capturing angle and an image-capturing position of the camera. The display appropriateness processing unit 402 can acquire information (i.e., an image-capturing angle and an image-capturing position) necessary to calculate the angle similarity value through the formula 2 by referring to the image information. The angle similarity value may be a value that can be used to evaluate at least one of the image-capturing angle, the image-capturing position, and the image-capturing distance, and a specific value thereof is not limited to the value described in the present exemplary embodiment.

In a case where the display appropriateness processing unit 402 calculates the angle similarity value of a fixed camera, a value that is previously set to the PC corresponding to that camera as a parameter according to the installation position may be used as a camera coordinate value. In addition to the above example, the display appropriateness processing unit 402 may use information acquired from a position sensor if the position sensor is attached to the camera, or may use information acquired from a direction sensor if the direction sensor is attached to the camera. Furthermore, as another example, if the camera having an automatic pan-tilt function is installed on a camera platform, the display appropriateness processing unit 402 may use a value calculated from a pre-set initial angle and pan-tilt control information as the camera coordinate value.

FIGS. 18A to 18C are graphs illustrating an example of transition in a calculation result of a display appropriateness value in the image-capturing system according to the present exemplary embodiment. FIG. 18A is a graph illustrating the display appropriateness values of the respective camera images when the first camera image is selected as a display image. In this case, the greatest angle similarity value of 60 is added as the angle additional value to the display appropriateness value of the first camera image selected as a display image. Further, an angle additional value of 50 is added to the second camera image acquired by the second camera 100b. The angle additional value of 20 that is smaller than the angle additional value added to the second camera image is added to the third camera image acquired by the third camera 100c. The distance between the image-capturing positions of the third camera 100c and the first camera 100a is greater than the distance between the image-capturing positions of the second camera 100b and the first camera 100a. Further, the image-capturing direction of the second camera 100b is the same as the image-capturing direction of the first camera 100a. On the other hand, the image-capturing direction of the third camera 100c is opposite to the image-capturing direction of the first camera 100a. Therefore, the angle additional value for the third camera image is smaller than the angle additional value for the second camera image.

FIG. 18B is a graph illustrating the display appropriateness values of respective camera images when the display image is switched from the first camera image to the second camera image. As illustrated in FIG. 18B, when a time has passed from the state illustrated in FIG. 18A and the region importance value of the gaze region B in the second camera image is increased, the display image is switched from the first camera image to the second camera image. FIG. 18C is a graph illustrating the display appropriateness values of the respective camera images when a time has passed from the state of FIG. 18B while the second camera image is continuously selected as a display image. When the second camera image is selected as a display image, the angle similarity values of respective images are recalculated and the display appropriateness values are updated. In other words, the maximum angle similarity value of 60 is added to the display appropriateness value of the second camera image. A distance between the image-capturing positions of the second camera 100b and the first camera 100a and a distance between the image-capturing positions of the second camera 100b and the third camera 100c are approximately the same. However, while the image-capturing direction of the first camera 100a is the same as the image-capturing direction of the second camera 100b, the image-capturing direction of the third camera 100c is opposite to the image-capturing direction of the second camera 100b. Therefore, the angle similarity value for the first camera 100a is 50 whereas the angle similarity value for the third camera 100c is 30, which is smaller than that of the first camera 100a.

As described above, the image-capturing system according to the present exemplary embodiment, when switching display images, prioritizes an image having an image-capturing angle similar to that of the display image. With the above-described configuration, the image-capturing system can reduce a drastic change in the image-capturing angle. Therefore, the image-capturing system can provide a display image which is easily understandable to the audience, while displaying an image which the audience is highly interested in.

According to the above-described exemplary embodiments, it is possible to display an image the display content of which is easily understandable to the audience, while displaying an image the audience is highly interested in.

While aspects of the present invention have been described in detail with reference to the exemplary embodiments, the above-described exemplary embodiments are not seen to be limiting, and variations and modifications are possible. Parts of the above-described exemplary embodiments can be combined with each other as appropriate. For example, the functions of the display appropriateness processing unit 402 according to the first to the third exemplary embodiments may be combined and executed concurrently.

According to aspects of the present invention, it is possible to display an image the display content of which is easily understandable to the audience, while displaying an image which the audience is highly interested in.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-168618, filed Aug. 21, 2014, which is hereby incorporated by reference herein in its entirety.

What is claimed is:

1. An information processing apparatus comprising:
one or more processors; and
a memory storing instructions that, when executed by the one or more processors configures the one or more processors to operate as:
a selection unit configured to select, from among a plurality images captured by a plurality of image-capturing apparatuses, an image having a high evaluation value with respect to content thereof to be displayed on a display apparatus;
a correction unit configured to make a correction, when display of the image is switched to display of another image among the plurality of images due to the evaluation value of the another image having becomes higher than the evaluation value of the image increase the evaluation value of the another image, wherein the evaluation value after the correction is higher than the evaluation value for content of the another image;
an extraction unit configured to extract a gaze region from the plurality of images; and
a derivation unit configured to derive a region evaluation value of the gaze region and the evaluation value of the image based on the region evaluation value,
wherein the evaluation value with respect to content of each of the plurality of images is the evaluation value derived by the derivation unit,
wherein, in a case where a same gaze region is extracted from different images by the extraction unit, the derivation unit, using the region evaluation value of the gaze region, increases an evaluation value of the image on the display apparatus, and does not increase evaluation values of others among the plurality of images not currently displayed on the display apparatus using the region evaluation value of the gaze region, and
wherein the selection unit determines, with respect to at least one of an image-capturing position, the evaluation value of each image based on a relationship between the image currently displayed on the display apparatus and other images of the plurality of images, an image-capturing angle, an image-capturing distance, and an image importance value.

2. The information processing apparatus according to claim 1 wherein the derivation unit derives a sum of the region evaluation; values of a plurality of gaze regions extracted from the image as the evaluation value.

3. The information processing apparatus according to claim 1, wherein the derivation unit derives the region evaluation value based on at least one of a type of an event occurring in the gaze region, an object existing in the gaze region, an area of the gaze region, or an angle between the object and the image-capturing apparatus.

4. The information processing apparatus according to claim 3, wherein the event is shooting, sing, competing, a penalty kick, a corner kick, a free kick, or a foul.

5. The information processing apparatus according to claim 3, wherein the object is either a human or a ball.

6. The information processing apparatus according to claim 1, wherein the evaluation value increased by the correction unit is lowered as time passes.

7. The information processing apparatus according to claim 1, wherein regions that can be by a plurality of the image-capturing apparatuses partially overlap each other.

8. The information processing apparatus according to claim 1, wherein, in a case where the selection unit selects the another image to switch the image displayed on the display apparatus, the correction unit lowers the evaluation value for the image displayed on the display apparatus before switching to the another image.

9. The information processing apparatus according to claim 1, wherein the correction unit makes a degree of the evaluation value greater as duration of displaying the image on the display apparatus increases.

10. An information processing apparatus comprising:
one or more processors; and
a memory storing instructions that, when executed by the one or more processors configures the one or more processors to operate as:
a selection unit configured to select, from among images captured by a plurality of the image-capturing apparatuses, an image having a high evaluation value with respect to content thereof to be displayed on a display apparatus;
a correction unit configured to make a correction, when display of the image is switched to display of another due to the evaluation value of the another image becomes higher than the evaluation value of the image, to increase the evaluation value of the another image, wherein the evaluation value after the correction is higher than the evaluation value for content of the another image;
an extraction unit configured to extract a gaze region from the plurality of images; and
a derivation unit derives the evaluation value based on at least one of a type of an event occurring in the gaze region, an object existing in the gaze region, an area of the gaze region, or an angle between the object and the image-capturing apparatus,
wherein, in a case where the corrected evaluation value of the image currently displayed on the display apparatus is greater than an evaluation value of other images of the plurality of images, the selection unit continuously selects the currently displayed image, and selects the other images in a case where the corrected evaluation value of the image currently displayed on the display apparatus is less than the evaluation value of the other images, and
wherein the selection unit determines, with respect to at least one of an image-capturing position, the evaluation value of each image based on a relationship between the image currently displayed on the display apparatus and other images of the plurality of images, an image-capturing angle, an image-capturing distance, and an image importance value.

11. An information processing apparatus comprising:
one or more processors; and
a memory storing instructions that, when executed by the one or more processors configures the one or more processors to operate as:
a selection unit configured to switch display of an image on a display apparatus by selecting the image having a high evaluation value with respect to content thereof at each given time of the image from among a plurality of images captured by a plurality of image-capturing apparatuses, wherein the content of the image changes as time passes; and a correction unit configured to make a correction, after display of the image is switched to another image due to the evaluation value of the another image become higher than the evaluation value of the image, to increase the evaluation value of the another image for a predetermined length of time, wherein the evaluation value after the correction is higher than the evaluation value for content of the another image;

an extraction unit configured to extract a gaze region from the plurality of images; and a derivation unit derives the evaluation value based on at least one of a type of an event occurring in the gaze region, an object existing in the gaze region, an area of the gaze region, or an angle between the object and the image-capturing apparatus, wherein the selection unit determines, with respect to at least one of an image-capturing position, an evaluation value of each image based on a relationship between the image currently displayed on the display apparatus and other images of the plurality of images, an image-capturing angle, an image-capturing distance, and an image importance value.

12. An information processing method comprising:
selecting, from among a plurality of images captured by a plurality of image-capturing apparatuses, an image having a high evaluation value with respect to content thereof to be displayed; and making a correction, when display of the image is switched to display of another due to the evaluation value of the another image become higher than the evaluation value of the image, to increase the evaluation value of the another image, wherein the evaluation value after the correction is higher than the evaluation value for content of the another image;

extracting a gaze region from the plurality of images; and deriving a region evaluation value of the gaze region and the evaluation value of the image based on the region evaluation value, wherein the evaluation value with respect to content of each of the plurality of images is the evaluation value derived by the derivation unit, wherein, in a case where a same gaze region is extracted from different images, using the region evaluation value of the gaze region, increasing an evaluation value of the image on the display apparatus, and not to increase evaluation values of others among the plurality of images not currently displayed on the display apparatus using the region evaluation value of the gaze region, wherein a sum of the region evaluation values of a plurality of gaze regions extracted from the image is derived as the evaluation value, and wherein the region value is derived based on at least a type of an event occurring in the gaze region, an object existing in the gaze region, an area of the gaze region, an angle between the object, and the image-capturing apparatus.

13. An information processing method comprising:
selecting, from among a plurality of images captured by a plurality of image-capturing apparatuses, an image having a high evaluation value with respect to content thereof to be displayed; and making a correction, when display of the image is switched to another image due to the evaluation value of the another image become higher than the evaluation value of the first image, to increase the evaluation value of the another image, wherein the evaluation value after the correction is higher than the evaluation value for content of the another image;

an extraction unit configured to extract a gaze region from the plurality of images; and deriving the evaluation value based on at least one of a type of an event occurring in the gaze region, an object existing in the gaze region, an area of the gaze region, or an angle between the object and the image-capturing apparatus, wherein, in a case where the corrected evaluation value of the image currently displayed is greater than the evaluation values of other images of the plurality of images, the currently displayed image is continuously selected, and selects the other images in a case where the corrected evaluation value of the image currently displayed is less than the evaluation value of the other images, and determining, with respect to at least one of an image-capturing position, an evaluation value of each image based on a relationship between the image currently displayed on the display apparatus and other images of the plurality of images, an image-capturing angle, an image-capturing distance, and an image importance value.

14. An information processing method comprising:
switching displaying of an image by selecting an image having a high evaluation value with respect to content thereof at each given time of the image captured by a plurality of image-capturing apparatuses from among a plurality of images, wherein content of the image changes as time passes;

make a correction, after display of the image is switched to another image due to the evaluation value of the another image become higher than the evaluation value of the image, to increase the evaluation value of the another image for a predetermined length of time, wherein the evaluation value after the correction is higher than the evaluation value for content of the another image;

an extraction unit configured to extract a gaze region from the plurality of images; and deriving the evaluation value based on at least one of a type of an event occurring in the gaze region, an object existing in the gaze region, an area of the gaze region, or an angle between the object and the image-capturing apparatus, and determining, with respect to at least one of an image-capturing position, an evaluation value of each image based on a relationship between the image currently displayed on the display apparatus and other images of the plurality of images, an image-capturing angle, an image-capturing distance, and an image importance value.

15. A non-transitory computer-readable storage medium storing computer executable instructions for causing a computer to perform an information processing method, the information processing method comprising:

selecting, from among images captured by a plurality of image-capturing apparatuses, an image having a high evaluation value with respect to content thereof to be displayed;

making a correction, when display of the image is switched to display of another image due to the evaluation value of the another image become higher than the evaluation value of the image, to increase the evaluation value of the another image, wherein the evaluation value after the correction is higher than the evaluation value for content of the another image;

extracting a gaze region from the images; and deriving a region evaluation value of the gaze region and the evaluation value of the image based on the region evaluation value, wherein the evaluation value with respect to content of each of the images is the evaluation value derived by the derivation unit, wherein, in a case where a same gaze region is extracted from different images, using the region evaluation value of the gaze region, increasing an evaluation value of the image on the display apparatus, and not to increase evaluation values of others among the images not currently displayed on the display apparatus using the region evaluation value of the gaze region, and determining, with respect to at least one of an image-capturing position, the evaluation value of each image based on a relationship between the image currently displayed on the display apparatus and other images of the plurality of images, an image-capturing angle, an image-capturing distance, and an image importance value.

16. A non-transitory computer-readable storage medium storing computer executable instructions for causing a computer to perform an information processing method, the information processing method comprising:

selecting, from among a plurality of images captured by a plurality of image-capturing apparatuses, an image having a high evaluation value with respect to content thereof to be displayed;

making a correction, when switching display of the image to another image to the evaluation value of the another image become higher than the evaluation value of the image, to increase the evaluation value of the another image, wherein the evaluation value after the correction is higher than the evaluation for content of the another image;

an extraction unit configured to extract a gaze region from the plurality of images; and deriving the evaluation value based on at least one of a type of an event occurring in the gaze region, an object existing in the gaze region, an area of the gaze region, or an angle between the object and the image-capturing apparatus, wherein, in a case where the corrected evaluation value of the image currently displayed is greater than the evaluation values of other images, the currently displayed image is continuously selected, and selects the other images in a case where the corrected evaluation value of the image currently displayed is less than the evaluation value of the other images, and determining, with respect to at least one of an image-capturing position, the evaluation value of each image based on a relationship between the image currently displayed on the display apparatus and other images of the plurality of images, an image-capturing angle, an image-capturing distance, and an image importance value.

17. A non-transitory computer-readable storage medium storing computer executable instructions for causing a computer to perform an information processing method, the information processing method comprising:

switching displaying of an image by selecting the image having a high evaluation value with respect to content thereof at each given time from among a plurality of images captured by a plurality of image-capturing apparatuses, wherein the content of the image changes as time passes;

making a correction, after displaying of the image is switched to display of another due to the evaluation value of the another image become higher than the evaluation value of the image, to increase the evaluation value of the another image, wherein the evaluation value after the correction is higher than the evaluation value for content of the another image;

extracting a gaze region from the plurality of images; and deriving a region evaluation value of the gaze region and the evaluation value of the image based on the region evaluation value, wherein the evaluation value with respect to content of each of the plurality of images is the evaluation value derived by the derivation unit, wherein, in a case where a same gaze region is extracted from different images, using the region evaluation value of the gaze region, increasing an evaluation value of the image on the display apparatus, and not to increase evaluation values of others among the plurality of images not currently displayed on the display apparatus using the region evaluation value of the gaze region, wherein a sum of the region evaluation values of a plurality of gaze regions extracted from the image is derived as the evaluation value, and wherein the region value is derived based on at least a type of an event occurring in the gaze region, an object existing in the gaze region, an area of the gaze region, an angle between the object, and the image-capturing apparatus.

* * * * *